United States Patent
Go et al.

(10) Patent No.: US 12,381,694 B2
(45) Date of Patent: Aug. 5, 2025

(54) METHOD AND APPARATUS FOR TRANSMITTING OR RECEIVING SOUNDING REFERENCE SIGNAL IN WIRELESS COMMUNICATION SYSTEM

(71) Applicant: LG Electronics Inc., Seoul (KR)

(72) Inventors: Seongwon Go, Seoul (KR); Jonghyun Park, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 395 days.

(21) Appl. No.: 17/606,353

(22) PCT Filed: Apr. 27, 2020

(86) PCT No.: PCT/KR2020/005512
§ 371 (c)(1),
(2) Date: Oct. 25, 2021

(87) PCT Pub. No.: WO2020/218904
PCT Pub. Date: Oct. 29, 2020

(65) Prior Publication Data
US 2022/0200768 A1     Jun. 23, 2022

Related U.S. Application Data

(60) Provisional application No. 62/838,910, filed on Apr. 25, 2019.

(51) Int. Cl.
*H04W 72/23* (2023.01)
*H04L 5/00* (2006.01)
*H04W 72/0446* (2023.01)

(52) U.S. Cl.
CPC .......... *H04L 5/0082* (2013.01); *H04L 5/0051* (2013.01); *H04W 72/0446* (2013.01); *H04W 72/23* (2023.01)

(58) Field of Classification Search
CPC .......................... H04W 72/0446; H04W 72/23
See application file for complete search history.

(56) References Cited

U.S. PATENT DOCUMENTS

| | | |
|---|---|---|
| 2011/0199944 A1 | 8/2011 | Chen et al. |
| 2013/0223394 A1 | 8/2013 | Nishio et al. |

(Continued)

FOREIGN PATENT DOCUMENTS

| | | |
|---|---|---|
| EP | 3471327 | 4/2019 |
| KR | 20180128043 | 11/2018 |

OTHER PUBLICATIONS

ETSI TS 138 213 V15.5.0 (May 2019), "5G; NR; Physical layer procedures for control," 3GPP TS 38.213 version 15.5.0 Release 15, May 2019, 106 pages.

(Continued)

*Primary Examiner* — Marcus Smith
*Assistant Examiner* — Zhaohui Yang
(74) *Attorney, Agent, or Firm* — Fish & Richardson P.C.

(57) ABSTRACT

A method for transmitting a sounding reference signal (SRS) by a terminal in a wireless communication system according to an embodiment of the present specification comprises the steps of: receiving configuration information relating to transmission of a sounding reference signal (SRS); receiving downlink control information (DCI) triggering the transmission of the SRS; and transmitting the SRS. The SRS is based on at least one of a first SRS and a second SRS configured in a region different from that of the first SRS, and the second SRS is transmitted on the basis of a configuration relating to the timing of transmission of the first SRS.

9 Claims, 16 Drawing Sheets

(56) References Cited

U.S. PATENT DOCUMENTS

| | | | |
|---|---|---|---|
| 2014/0016475 A1* | 1/2014 | Zhou | H04W 72/569 370/236 |
| 2014/0334355 A1 | 11/2014 | Ekpenyong et al. | |
| 2015/0003305 A1* | 1/2015 | Park | H04L 5/0048 370/336 |
| 2015/0043465 A1 | 2/2015 | Ouchi | |
| 2015/0078222 A1* | 3/2015 | Yang | H04W 72/1268 370/280 |
| 2017/0222776 A1 | 8/2017 | Dinan | |
| 2017/0302419 A1* | 10/2017 | Liu | H04L 5/0078 |
| 2018/0020423 A1* | 1/2018 | Wang | H04W 64/00 |
| 2018/0131494 A1 | 5/2018 | Li et al. | |
| 2018/0176835 A1 | 6/2018 | Park et al. | |
| 2020/0228190 A1* | 7/2020 | Cirik | H04B 7/088 |
| 2021/0409178 A1* | 12/2021 | Faxér | H04W 72/1273 |

OTHER PUBLICATIONS

Extended European Search Report in European Application No. 20795432.2, dated May 27, 2022, 9 pages.
Huawei et al., "Introduction of additional SRS Symbols in normal UL subframe," 3GPP TSG RAN WG1 Meeting #96bis, R1-1904010, Xi'an, China, Apr. 8-12, 2019, 5 pages.
Lenovo et al., "Discussion of additional SRS symbols," 3GPP TSG RAN WG1 Meeting #96, R1-1902164, Athens, Greece, Feb. 25-Mar. 1, 2018, 5 pages.
LG Electronics, "Discussion on UL beam management," 3GPP TSG RAN WG1 Meeting #89, R1-1707605, Hangzhou, China, May 15-19, 2017, 6 pages.
Office Action in Korean Application No. 10-2021-7034794, dated May 13, 2022, 4 pages (with English translation).
Sony, "Summary of SRS," 3GPP TSG RAN WG1 Meeting #92, R1-1803410, Athens, Greece, Feb. 26-Mar. 2, 2018, 31 pages.
Vivo, "Further discussion on SRS enhancements," 3GPP TSG RAN WG1 Meeting #95, R1-1812280, Spokane, USA, Nov. 12-16, 2018, 4 pages.
3GPP, "3rd Generation Partnership Project; Technical Specification Group Radio Access Network; NR; Physical channels and modulation (Release 15)," TS 38.211 V15.5.0, Mar. 2019, 96 pages.
3GPP, "Release 14: Foreword," TS 36.211 V14.10.0, Mar. 2019, 66 pages.
Office Action in Korean Appln. No. 10-2021-7034794, dated Jan. 19, 2022, 10 pages (with English translation).
3GPP TS 36.211 V14.10.0 (Mar. 2019), 3rd Generation Partnership Project Technical Specification Group Radio Access Network, study on Evolved Universal Terrestrial Radio Access (E-UTRA), Physical channels and modulation (Release 14), Mar. 2019, 7 pages.
3GPP TS 38.211 V15.5.0 (Mar. 2019), 3rd Generation Partnership Project Technical Specification Group Radio Access Network, study on Physical channels and modulation(Release 15), Mar. 2019, 96 pages.
Notice of Allowance in Chinese Appln. No. 202080030323.9, mailed on Jul. 24, 2023, 12 pages (with English translation).
International Search Report in International Appln. No. PCT/KR2020/005512, dated Jul. 31, 2020, 5 pages (with English translation).
Lenovo, Motorola Mobility, "Discussion of additional SRS symbols," R1-1904571, Presented at 3GPP TSG RAN WG1 Meeting #96bis, Xi'an, China, Apr. 8-Apr. 12, 2019, 5 pages.
LG Electronics, "Discussion on additional SRS symbols," R1-1904195, Presented at 3GPP TSG RAN WG1 Meeting #96bis, Xi'an, China, Apr. 8-12, 2019, 5 pages.
Nokia, Nokia Shanghai Bell, "Discussion on introduction of additional SRS symbols," R1-1904601, Presented at 3GPP TSG RAN WG1 Meeting #96bis, Xi'an, China, Apr. 8-12, 2019, 4 pages.
Qualcomm Incorporated, "Additional SRS symbols," R1-1904532, Presented at 3GPP TSG-RAN WG1 #96bis, Xi'an, China, Apr. 8-12, 201, 9 pages.

* cited by examiner (a) SINGLE CC (b) MULTIPLE CC

METHOD AND APPARATUS FOR TRANSMITTING OR RECEIVING SOUNDING REFERENCE SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2020/005512, filed on Apr. 27, 2020, which claims the benefit of U.S. Provisional Application No. 62/838,910, filed on Apr. 25, 2019. The disclosures of the prior applications are incorporated by reference in their entirety.

TECHNICAL FIELD

The disclosure relates to a method and device for transmitting/receiving a sounding reference signal in a wireless communication system.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DETAILED DESCRIPTION OF THE DISCLOSURE

Technical Problem

The disclosure proposes a method for transmitting a sounding reference signal. Specifically, based on a codepoint of downlink control information (DCI), at least one of a legacy SRS or an additional SRS may be triggered. In this case, in relation to the transmission timing of the additional SRS, ambiguity in the operation of the UE may occur. Accordingly, the disclosure proposes a sounding reference signal transmission method capable of removing ambiguity related to the transmission timing of the additional SRS.

Objects of the disclosure are not limited to the foregoing, and other unmentioned objects would be apparent to one of ordinary skill in the art from the following description.

Technical Solution

According to an embodiment of the disclosure, a method for transmitting a sounding reference signal (SRS) by a user equipment (UE) in a wireless communication system comprises receiving configuration information related to transmission of a sounding reference signal (SRS), receiving downlink control information (DCI) which triggers transmission of the SRS, and transmitting the SRS.

The SRS is based on at least one of a first SRS or a second SRS configured in an area different from the first SRS. The second SRS is transmitted based on a configuration related to a transmission timing of the first SRS.

The first SRS may be configured in a last symbol of a subframe, and the second SRS is configured in an area except for the last symbol in the subframe.

The subframe may not be a special subframe.

The configuration related to the transmission timing of the first SRS may be based on a UE-specific configuration. The UE-specific configuration may be related to at least one of a transmission period or a transmission offset.

The second SRS may be transmitted in a specific subframe. The specific subframe may be based on an uplink subframe after a subframe in which the DCI is detected.

The second SRS may be delayed and transmitted based on the specific subframe wholly or partially overlapping a resource region in which another uplink channel is transmitted.

The second SRS may be transmitted in an uplink subframe after the specific subframe.

The uplink subframe after the specific subframe may be a subframe based on a configuration related to a transmission timing of the first SRS.

When a subframe in which the delayed transmission of the second SRS is performed wholly or partially overlaps a resource region in which another uplink channel is transmitted, the second SRS may be redelayed and transmitted.

The transmission of the second SRS may be dropped based on a number of times of delay of the transmission of the second SRS exceeding a predetermined value.

According to another embodiment of the disclosure, a UE transmitting a sounding reference signal (SRS) in a wireless communication system comprises one or more transceivers, one or more processors, and one or more memories operably connectible to the one or more processors and storing instructions to, when the transmission of the SRS is executed by the one or more processors, perform operations.

The operations comprise receiving configuration information related to transmission of a sounding reference signal (SRS), receiving downlink control information (DCI) which triggers transmission of the SRS, and transmitting the SRS.

The SRS is based on at least one of a first SRS or a second SRS configured in an area different from the first SRS. The second SRS is transmitted based on a configuration related to a transmission timing of the first SRS.

According to still another embodiment of the disclosure, a device includes one or more memories and one or more processors functionally connected with the one or more memories.

The one or more processors are configured to enable the device to receive configuration information related to transmission of a sounding reference signal (SRS), receive downlink control information (DCI) which triggers transmission of the SRS, and transmit the SRS.

The SRS is based on at least one of a first SRS or a second SRS configured in an area different from the first SRS. The second SRS is transmitted based on a configuration related to a transmission timing of the first SRS.

According to another embodiment of the disclosure, one or more non-transitory computer-readable media store one or more instructions.

The one or more instructions executable by one or more processors are configured to control a UE to receive configuration information related to transmission of a sounding reference signal (SRS), receive downlink control information (DCI) which triggers transmission of the SRS, and transmit the SRS.

The SRS is based on at least one of a first SRS or a second SRS configured in an area different from the first SRS. The second SRS is transmitted based on a configuration related to a transmission timing of the first SRS.

According to another embodiment of the disclosure, a method for receiving a sounding reference signal (SRS) by a base station in a wireless communication system comprises transmitting configuration information related to transmission of a sounding reference signal (SRS), transmitting downlink control information (DCI) which triggers transmission of the SRS, and receiving the SRS.

The SRS is based on at least one of a first SRS or a second SRS configured in an area different from the first SRS. The second SRS is transmitted based on a configuration related to a transmission timing of the first SRS.

According to another embodiment of the disclosure, a base station receiving a sounding reference signal (SRS) in a wireless communication system comprises one or more transceivers, one or more processors, and one or more memories operably connectible to the one or more processors and storing instructions to, when the reception of the SRS is executed by the one or more processors, perform operations.

The operations include transmitting configuration information related to transmission of a sounding reference signal (SRS), transmitting downlink control information (DCI) which triggers transmission of the SRS, and receiving the SRS.

The SRS is based on at least one of a first SRS or a second SRS configured in an area different from the first SRS. The second SRS is transmitted based on a configuration related to a transmission timing of the first SRS.

Advantageous Effects

According to an embodiment of the disclosure, the second SRS may be transmitted based on a configuration related to the transmission timing of the first SRS. Accordingly, the complexity of the configuration between the base station and the UE and the complexity of the UE operation may be reduced by arranging the transmission timing of the additional SRS together with the transmission timing of the legacy SRS.

According to an embodiment of the disclosure, the second SRS is transmitted in a specific subframe. The specific subframe is based on an uplink subframe after the subframe in which the DCI triggering transmission of the SRS is detected. The second SRS may be delayed and transmitted based on the specific subframe wholly or partially overlapping a resource region in which another uplink channel is transmitted. Accordingly, it is possible to prevent collision between the second SRS and another uplink channel and to ensure the reliability of the second SRS transmission.

According to an embodiment of the disclosure, when a subframe in which the delayed transmission of the second SRS is performed wholly or partially overlaps a resource region in which another uplink channel is transmitted, the second SRS may be redelayed and transmitted. The transmission of the second SRS may be dropped based on a number of times of delay of the transmission of the second SRS exceeding a predetermined value. Accordingly, it is possible to prevent collision with another uplink channel due to the changed transmission timing of the second SRS.

Further, it is possible to prevent the UE-base station operation from becoming too complicated and prevent indiscriminate waste of resources.

Effects of the disclosure are not limited to the foregoing, and other unmentioned effects would be apparent to one of ordinary skill in the art from the following description.

MODE FOR CARRYING OUT THE INVENTION

Figure 1:
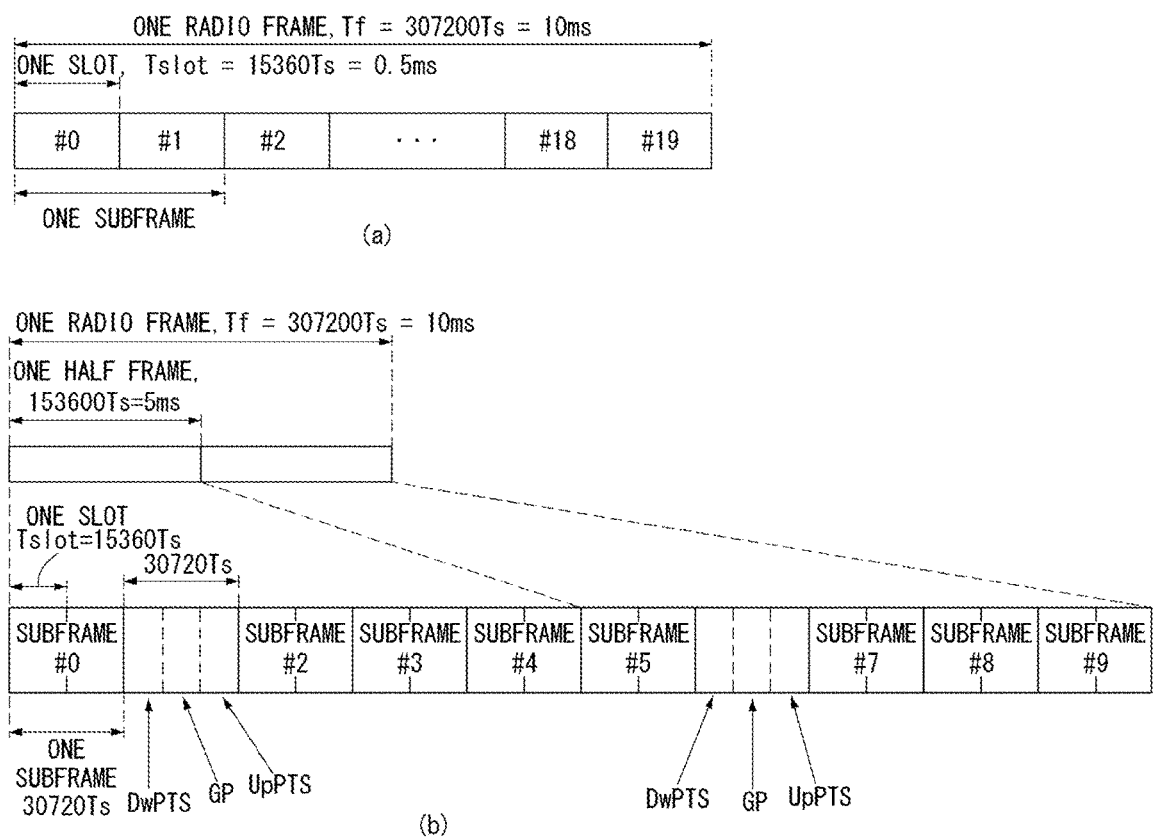
FIG. 1 shows the structure of a radio frame in a wireless communication system to which a method proposed in the disclosure may be applied.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

General System

FIG. 1 shows the structure of a radio frame in a wireless communication system to which a method proposed in the disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

(a) of FIG. 1 exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

(b) of FIG. 1 shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

subcarriers included in a radio frame, the number of slots included in a subframe and the number of OFDM symbols included in a slot may be changed in various manners.

Figure 2:
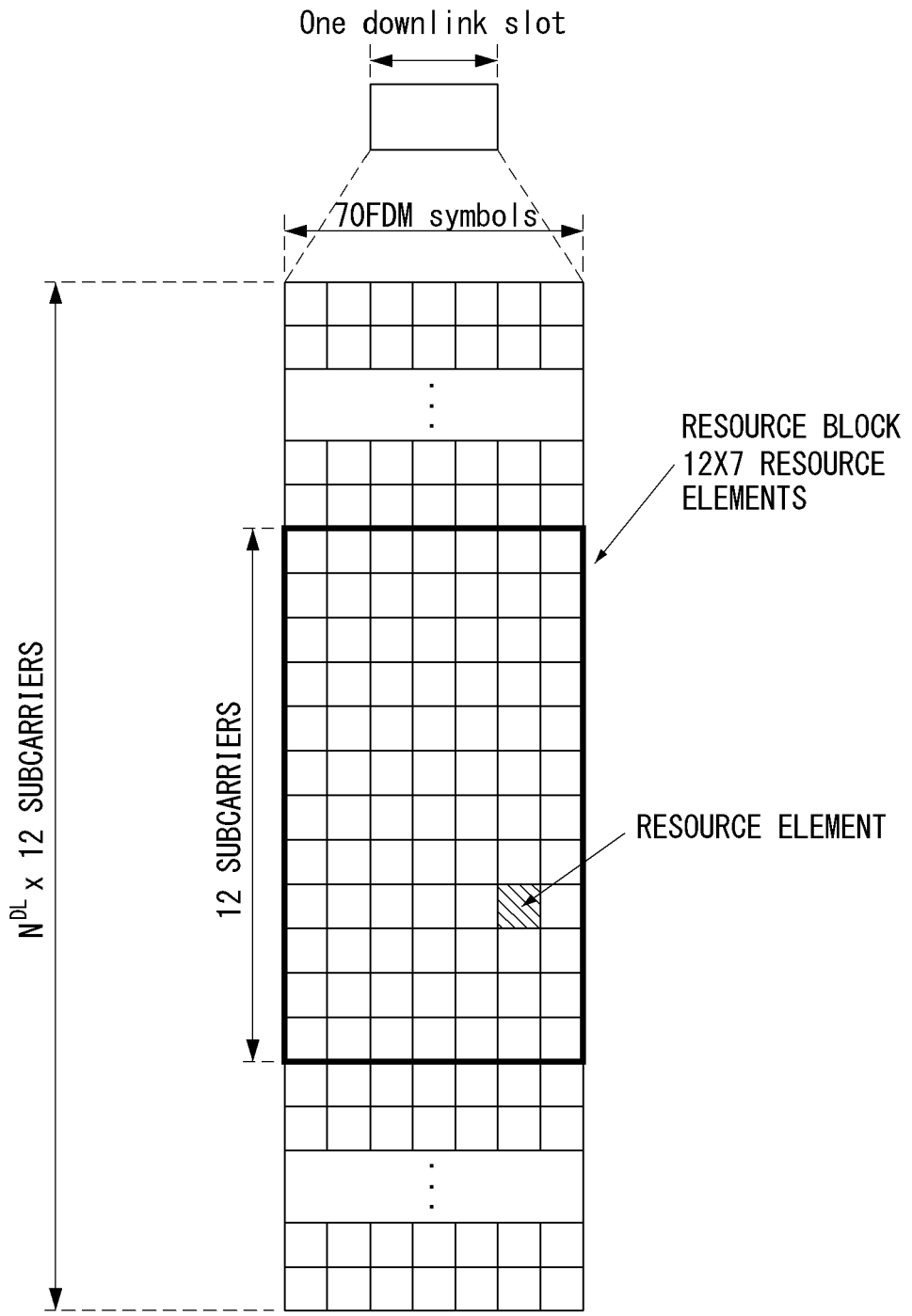
FIG. 2 is a diagram illustrating a resource grid for one downlink slot in a wireless communication system to which a method proposed in the disclosure may be applied.

FIG. 2 is a diagram illustrating a resource grid for one downlink slot in a wireless communication system to which a method proposed in the disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the disclosure is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
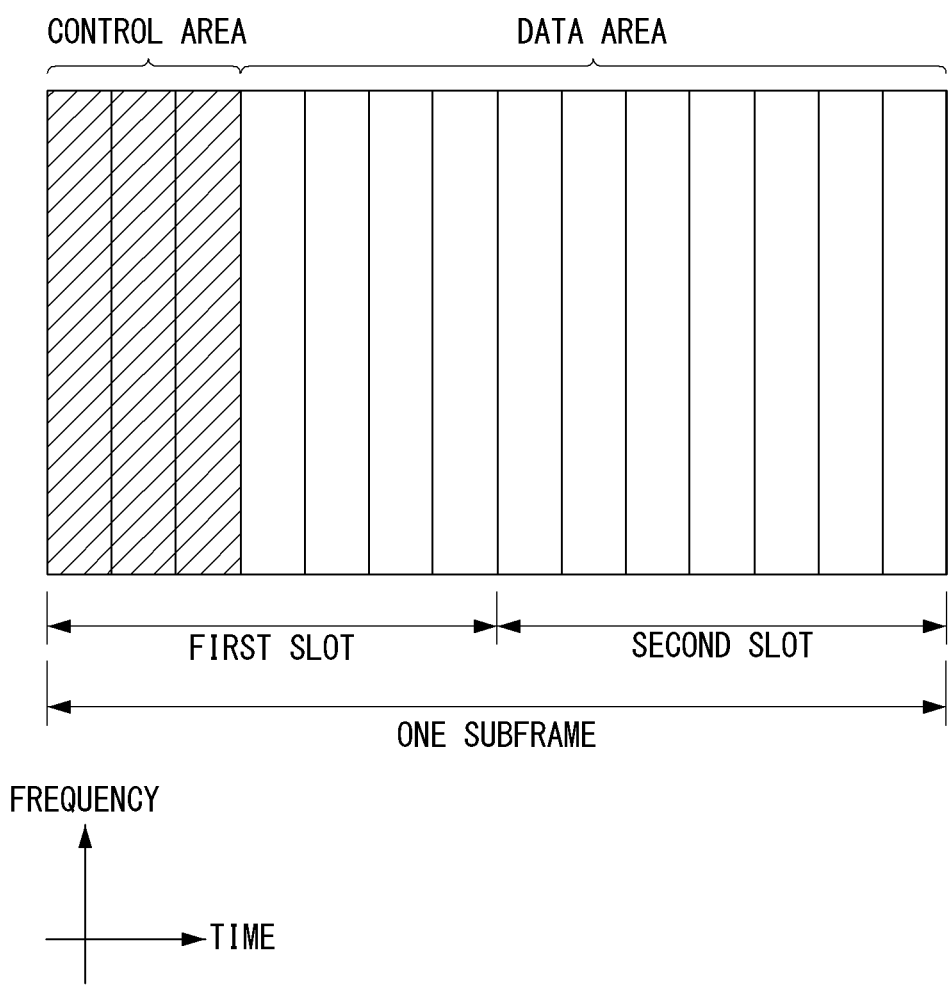
FIG. 3 shows the structure of a downlink subframe in a wireless communication system to which a method proposed in the disclosure may be applied.

FIG. 3 shows the structure of a downlink subframe in a wireless communication system to which a method proposed in the disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

The structure of a radio subframe according to the example of FIG. 1 is just an example, and the number of A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
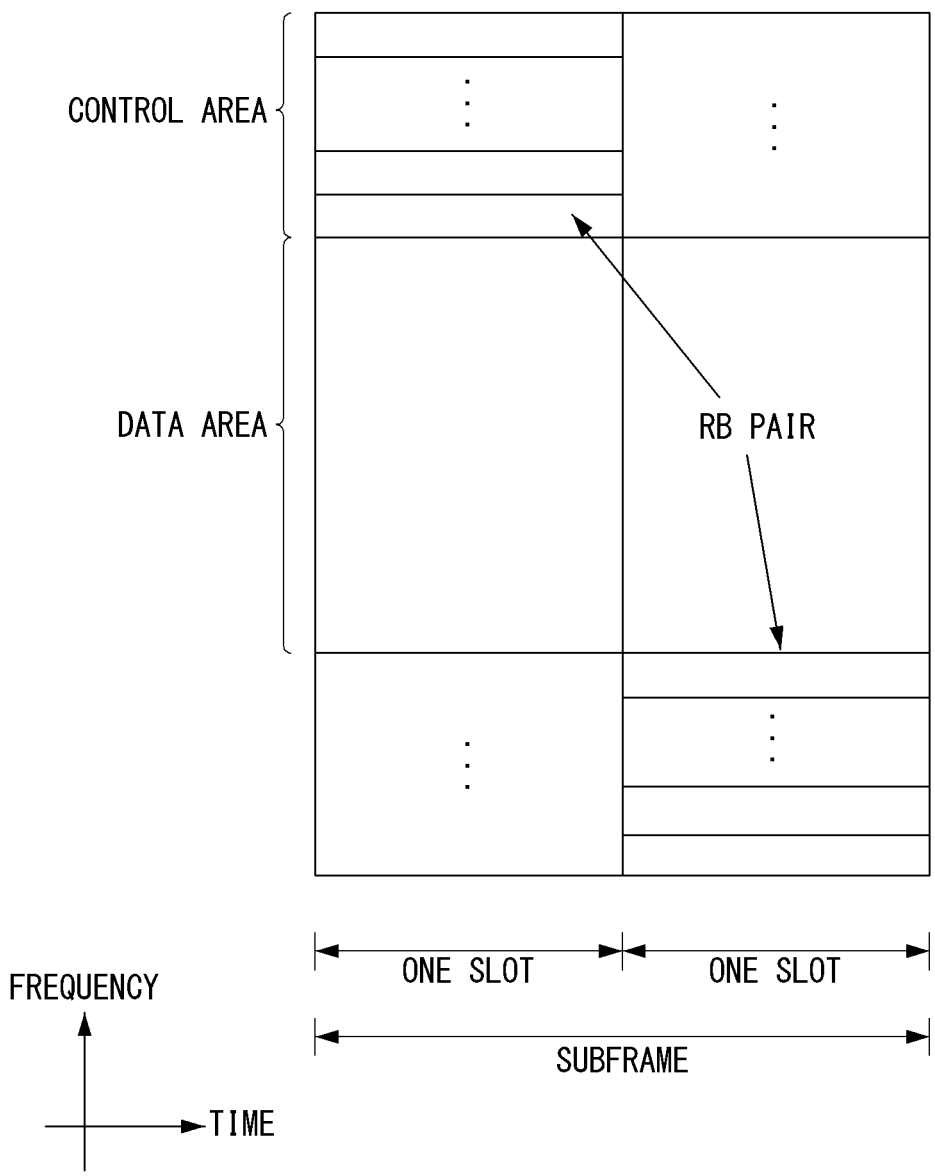
FIG. 4 shows the structure of an uplink subframe in a wireless communication system to which a method proposed in the disclosure may be applied.

FIG. 4 shows the structure of an uplink subframe in a wireless communication system to which a method proposed in the disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Channel and General Signal Transmission

Figure 5:
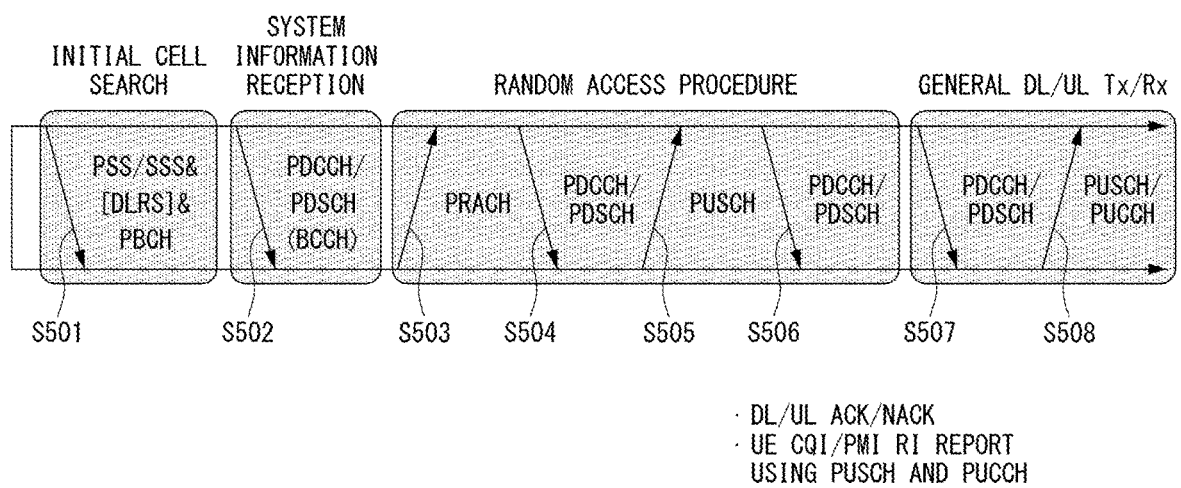
FIG. 5 illustrates physical channels and general signal transmission used in a 3GPP system.

FIG. 5 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S501). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S502).

Meanwhile, when there is no radio resource first accessing the eNB or for signal transmission, the UE may perform a Random Access Procedure (RACH) to the eNB (S503 to S506). To this end, the UE may transmit a specific sequence to a preamble through a Physical Random Access Channel (PRACH) (S503 and S505) and receive a response message (Random Access Response (RAR) message) for the preamble through the PDCCH and a corresponding PDSCH. In the case of a contention based RACH, a Contention Resolution Procedure may be additionally performed (S506).

The UE that performs the above procedure may then perform PDCCH/PDSCH reception (S507) and Physical Uplink Shared Channel (PUSCH)/Physical Uplink Control Channel (PUCCH) transmission (S508) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Sounding Reference Signal (SRS)

An SRS is mainly used for channel quality measurement to perform uplink frequency-selective scheduling and is not related to transmission of uplink data and/or control information. However, the disclosure is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a certain UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array completely turns off a switch of the SRS in the cell and this is primarily suitable for a serving cell that serves high-speed terminals.

Figure 6:
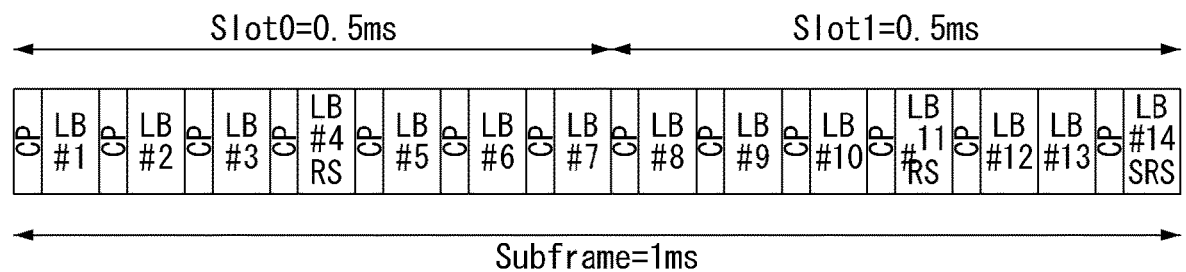
FIG. 6 illustrates an uplink subframe including an SRS in a wireless communication system to which a method proposed in the disclosure may be applied.

FIG. 6 illustrates an uplink subframe including an SRS in a wireless communication system to which a method proposed in the disclosure may be applied.

Referring to FIG. 6, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

SRS Transmission in NR System

In NR systems, an SRS sequence for SRS resources may be generated by Equation 1 below.

$$r^{(pi)}(n,l') = r_{u,v}^{(\alpha_i,\delta)}(n)$$

$$0 \le n \le 271 \cdot N_{sc}^{RB}/K_{TC}$$

$$l' \in \{0,1,\ldots,N_{symb}^{SRS}-1\} \qquad \text{[Equation 1]}$$

In Equation 1, $r_{u,v}^{(\alpha_i,\delta)}(n)$ denotes the sequence number (v) of SRS and the sequence set by the sequence group (u), and the transmission comb (TC) number, $K\_TC(K_{TC})$ may be included in the higher layer parameter, SRS-TransmissionComb.

Further, for antenna port $p_i$, the cyclic shift (SC) $\alpha_i$ may be given as in Equation 2 below.

$$\alpha_i = 2\pi \frac{n_{SRS}^{cs,i}}{n_{SRS}^{cs,max}} \qquad \text{[Equation 2]}$$

$$n_{SRS}^{cs,i} = \left(n_{SRS}^{cs} + \frac{n_{SRS}^{cs,max} p_i}{N_{ap}}\right) \mod n_{SRS}^{cs,max}$$

In Equation 2, $n_{SRS}^{cs} \in \{0, 1, \ldots n_{SRS}^{cs,max}\}$ may be given by the higher layer parameter SRS-CyclicShiftConFIG. Further, the maximum value of the cyclic shift, if K_TC is 4, may be 12 (i.e., $n_{SRS}^{cs,max}=12$) and if K_TC is 2, 8 (i.e. $n_{SRS}^{cs,max}=8$).

The sequence group $(u)(u=(f_{gh}(n_{s,f}^\mu,l')+n_{ID}^{SRS}$ mod 30)mod 30) and the sequence number (u) may comply with the higher layer parameter SRS-GroupSequenceHopping. Further, the SRS sequence identifier $n_{ID}^{SRS}$ may be given by the higher layer parameter SRS-SequenceId. l' (i.e., l'$\in \{0, 1, \ldots, N_{symb}^{SRS}-1\}$) denotes the OFDM symbol number in the SRS resource.

At this time, if SRS-GroupSequenceHopping is 0, group hopping and sequence hopping are not used, which may be represented as in Equation 3 below.

$$f_{gh}(n_{s,f}^\mu,l')=0$$

$$v=0 \qquad \text{[Equation 3]}$$

In Equation 3, f_gh(x, y) denotes sequence group hopping, and v denotes sequence hopping.

Or, if SRS-GroupSequenceHopping is 1, group hopping, not sequence hopping, is used, and this may be expressed as in Equation 4.

$$f_{gh}(n_{s,f},l')=(\Sigma_{m=0}^{7} c(8(n_{s,f}N_{symb}^{SRS}+l')+m)\cdot 2^m) \mod 30$$

$$v=0 \qquad \text{[Equation 4]}$$

In Equation 4, f_gh(x, y) denotes sequence group hopping, and v denotes sequence hopping. c(i) denotes the pseudo-random sequence and may be initialized as $c_{int}=\lfloor n_{ID}^{SRS}/30 \rfloor$ at the start of each radio frame.

Or, if SRS-GroupSequenceHopping is 2, sequence hopping, not group hopping, is used, and this may be expressed as in Equation 5.

$$f_{gh}(n_{s,f},l') = 0 \qquad \text{[Equation 5]}$$

$$v = \begin{cases} c(n_{s,f}N_{symb}^{SRS}+l') & M_{sc,b}^{SRS} \ge 3N_{sc}^{RB} \\ 0 & \text{otherwise} \end{cases}$$

In Equation 5, f_gh(x, y) denotes sequence group hopping, and v denotes sequence hopping. c(i) denotes the pseudo-random sequence and may be initialized as $c_{int}=\lfloor n_{ID}^{SRS}/30 \rfloor \cdot 2^5+(n_{ID}^{SRS}+\Delta_{ss}) \mod 30$ at the start of each radio frame (where, $\Delta_{ss} \in \{0, 1, \ldots, 29\}$).

Sounding Reference Signal (SRS) hopping

SRS hopping may be performed only upon periodic SRS triggering (e.g., triggering type 0). Further, allocation of SRS resources may be provided according to a pre-defined hopping pattern. In this case, the hopping pattern may be designated UE-specifically via higher layer signaling (e.g., RRC signaling) and no overlap is allowed.

Further, SRS is frequency-hopped using the hopping pattern in every subframe where cell-specific and/or UE-specific SRS is transmitted, and the start position and hopping equation in the frequency domain of SRS hopping may be interpreted via Equation 6 below.

$$k_0^{(p)} = \bar{k}_0^{(p)} + \sum_{b=0}^{B_{SRS}} K_{TC} M_{sc,b}^{RS} n_b \qquad \text{[Equation 6]}$$

$$n_b = \begin{cases} \lfloor 4n_{RRC}/m_{SRS,b} \rfloor \mod N_b & b \le b_{hop} \\ \{F_b(n_{SRS}) + \lfloor 4n_{RRC}/m_{SRS,b} \rfloor\} \mod N_b & \text{otherwise} \end{cases}$$

$$F_b(n_{SRS}) =$$

$$n_{SRS} = \begin{cases} (N_b/2) \left[ \dfrac{n_{SRS} \bmod \prod_{b'=b_{hop}}^{b} N_{b'}}{\prod_{b'=b_{hop}}^{b} N_{b'}} \right] + \left[ \dfrac{n_{SRS} \bmod \prod_{b'=b_{hop}}^{b} N_{b'}}{\prod_{b'=b_{hop}}^{b} N_{b'}} \right] & \text{if } N_b \text{ even} \\ \lfloor N_b/2 \rfloor \lfloor n_{SRS} / \prod_{b'=b_{hop}}^{b-1} N_{b'} \rfloor & \text{if } N_b \text{ odd} \end{cases}$$

$$n_{SRS} = \begin{cases} 2N_{SP}n_f + 2(N_{SP}-1)\lfloor \dfrac{n_s}{10} \rfloor + \lfloor \dfrac{T_{offset}}{T_{offset\_max}} \rfloor, & \text{for 2 msSRS periodicity of frame structure type 2} \\ \lfloor (n_f \times 10 + \lfloor n_s/2 \rfloor)/T_{SRS} \rfloor, & \text{otherwise} \end{cases}$$

In Equation 6, nSRS means the hopping interval in the time domain, and Nb denotes the number of branches allocated to tree level b where b may be determined by the BSRS configuration in the dedicated RRC.

Figure 7:
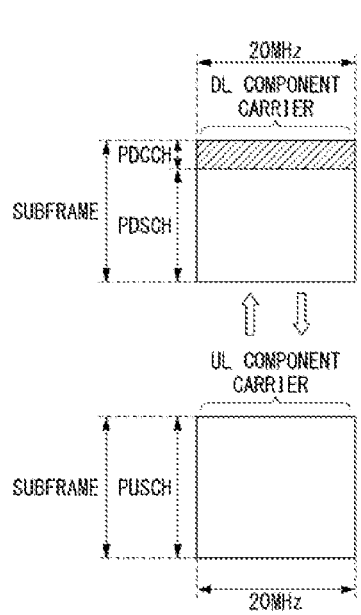
FIG. 7 illustrates one example of a component carrier and carrier aggregation in a wireless communication system to which a method proposed in the disclosure may be applied.
Figure 7:
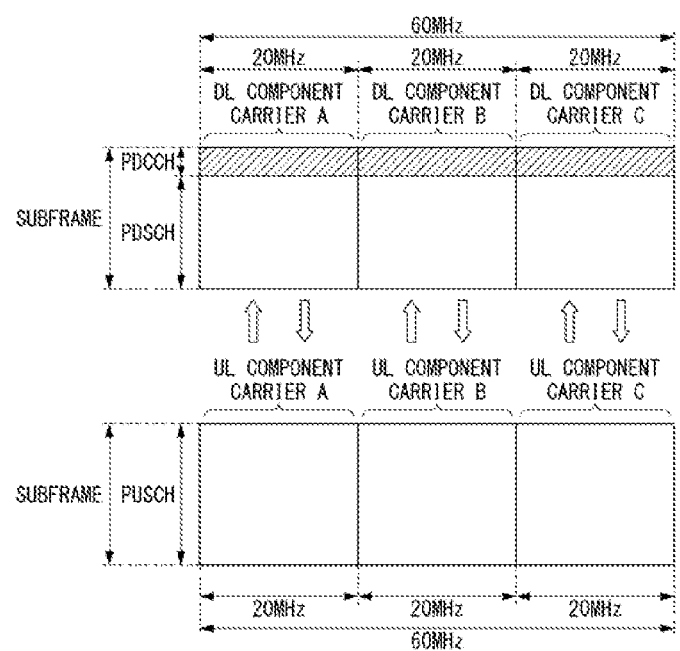

FIG. 7 illustrates one example of a component carrier and carrier aggregation in a wireless communication system to which a method proposed in the disclosure may be applied.

(a) of FIG. 7 shows a single carrier structure defined in the LTE system. Two types of component carriers are used: DL CC and UL CC. A component carrier may have frequency bandwidth of 20 MHz.

(b) of FIG. 7 shows a carrier aggregation structure used in the LTE A system. (b) of FIG. 7 shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network may allocate M (M≤N) DL CCs to the UE. At this time, the UE may monitor only the M DL CCs and receive a DL signal from the M DL CCs. Also, the network may assign priorities for L (L≤M≤N) DL CCs so that primary DL CCs may be allocated to the UE; in this case, the UE has to monitor the L DL CCs. This scheme may be applied in the same manner to uplink transmission.

Linkage between a carrier frequency of downlink resources (or DL CC) and a carrier frequency of uplink resources (or UL CC) may be designated by a higher layer message such as an RRC message or system information. For example, according to the linkage defined by system information block type 2 (SIB2), a combination of DL resources and UL resources may be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

Figure 8:
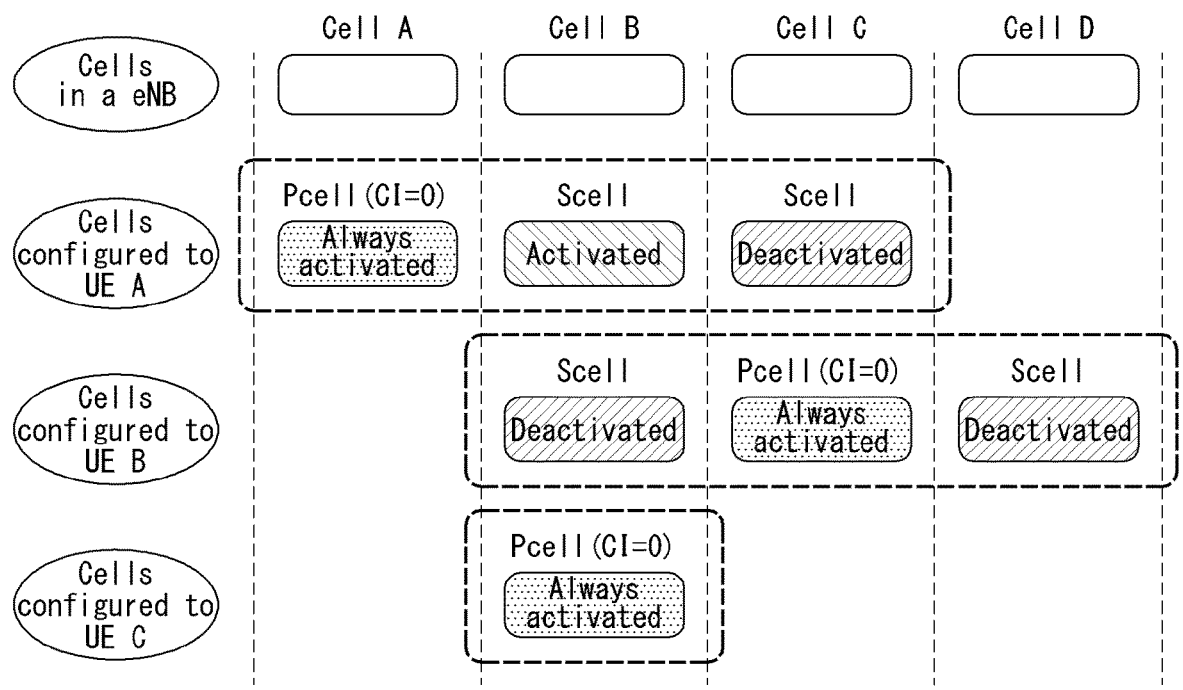
FIG. 8 illustrates an example a distinguishment of cells in a system supporting carrier aggregation, to which a method proposed in the disclosure may be applied.

FIG. 8 illustrates an example a distinguishment of cells in a system supporting carrier aggregation, to which a method proposed in the disclosure may be applied.

Referring to FIG. 8, a configured cell is a cell which is configured for carrier aggregation based on a measurement report among cells of an eNB and is configured for each UE as shown in FIG. 5. A configured cell may reserve a resource for ack/nack transmission in advance with respect to PDSCH transmission. An activated cell is a cell configured to actually transmit a PDSCH/PUSCH among the configured cells, which performs Channel State Information (CSI) reporting for PDSCH/PUSCH transmission and Sounding Reference Signal (SRS) transmission. A de-activated cell is a cell configured not to perform PDSCH/PUSCH transmission by a command from the eNB or timer operation, which may stop CSI reporting and SRS transmission.

The foregoing description may be combined with the methods described below according to the disclosure or may be provided to specify or clarify the technical features of the methods proposed herein. Further, the embodiments and/or methods described in the disclosure are differentiated solely for ease of description, and some components in any one method may be replaced, or combined with components of another method.

According to the conventional LTE schemes up to Rel-15, a sounding reference signal (SRS) may be transmitted in the last symbol of each subframe of the FDD system. In the TDD system, in relation to SRS transmission, a special subframe may be utilized in addition to the UL normal subframe. Specifically, an Uplink Pilot Time Slot (UpPTS) of the special subframe may be utilized for SRS transmission. The SRS may be transmitted in 1 symbol or 2 symbols according to a special subframe configuration.

The SRS may be transmitted in 2 symbols or 4 symbols depending on whether an additional UL single SC-FDMA symbol (Single Carrier Frequency Division Multiple Access symbol) is configured in addition to the existing UpPTS in the special subframe. The LTE SRS is triggered based on type 0 or type 1 according to time domain characteristics. Type 0 is a periodic SRS based on a higher layer configuration, and type 1 is an aperiodic SRS triggered by DCI.

An example of transmission timing of type 1 SRS is as follows. When the UE detects a positive SRS request in subframe n (or slot 2n or slot 2n+1), the UE transmits the SRS at the following timing (e.g., a subframe). Specifically, the UE transmits the SRS in the first subframe that complies with UE-specific SRS configurations (i.e., SRS transmission period (e.g., SRS periodicity) or SRS transmission offset (e.g., SRS subframe offset)) after subframe n+k (e.g., k=4 or k determined according to the UE capability).

In relation to the transmission of the SRS and the transmission of the PUSCH, the UE and the base station may operate as follows.

The base station may configure a combination of subframe numbers in which a cell specific SRS has been allocated in the UE in a normal subframe in a cell specific manner.

When performing PUSCH resource element mapping in the subframe to which the cell specific SRS has been allocated, the UE protects the SRS by leaving the last symbol in which the cell specific SRS has been configured blank regardless of whether a UE specific SRS is configured. Further, when PUSCH transmission and SRS transmission collide in the uplink pilot timeslot (UpPTS) of a TDD special subframe, no SRS is transmitted. Even in the case of carrier aggregation, if the SRS of the first serving cell and the PUSCH of the second serving cell overlap the same symbol in the time domain, the UE may drop the SRS.

The operation of the UE related to the transmission of the SRS and the transmission of the PUCCH is described below.

When the SRS and the PUCCH format 2 series (2/2a/2b) collide in the same subframe of the same serving cell, the UE may operate as follows.

In the case of an SRS triggered by type 0, the UE does not transmit the corresponding SRS.

In the case of an SRS triggered by type 1, 1) the UE does not transmit the corresponding SRS when it collides with a PUCCH including HARQ-ACK, and 2) the UE may transmit the corresponding Srs when it collides with PUCCH format 2 including no HARQ-ACK.

The UE may simultaneously transmit the SRS and the PUCCH in the same subframe using a shortened PUCCH. Specifically, the shortened PUCCH is PUCCH format 1 (1/1a/b) and format 3, 4, and 5, and the data of uplink control information (UCI) is not included in the last symbol of the corresponding subframe.

In the shortened PUCCH, whether to transmit simultaneously with the SRS is set by the higher layer parameter ackNackSRS-SimultaneousTransmission.

When simultaneous transmission of SRS and shortened PUCCH is not set (when ackNackSRS-SimultaneousTransmission is FALSE), if the SRS collides with the PUCCH including a positive SR and/or HARQ-ACK in the same subframe (or slot or subslot), the UE does not transmit the SRS.

Even when simultaneous transmission of the SRS and the shortened PUCCH is set (when ackNackSRS-SimultaneousTransmission is TRUE), if the SRS overlaps at the symbol level with the shortened PUCCH including HARQ-ACK and/or positive SR, the UE does not transmit the SRS.

In the case of PUCCH format 1 series and format 3, in the subframe in which a cell-specific SRS has been configured, the format of the shortened PUCCH may be used regardless of whether a UE-specific SRS is configured. In the case of PUCCH format 4/5, in the subframe in which a cell-specific SRS has been configured, the format of the shortened PUCCH is used if it overlaps the bandwidth of the cell-specific SRS regardless of whether the UE-specific SRS is configured.

Hereinafter, an agreement related to LTE MIMO enhancement (additional SRS) that may be applied to the method proposed in the disclosure is described.

1. Agreement (Scenarios Considered for Additional SRS)

The work for additional SRS symbols in this WI should consider the following scenarios
  TDD for non-CA
  TDD only CA
  FDD-TDD CA 2. Agreement (Position in Time Domain of Additional SRS Symbol)

Positions in the time domain of additional SRS symbols possible in one general UL subframe for a cell include:
  Option 1: Use all symbols in one slot for SRS from a cell perspective
  For example, another slot of the subframe may be used for PUSCH transmission for an sTTI capable UE.
  Option 2: Use all symbols in one subframe for SRS from a cell perspective
  Option 3: A subset of symbols in one slot may be used for SRS from a cell perspective However, the position of the additional SRS is not limited to the above-described options.

For an area with a low downlink SINR, support of an additional SRS symbol per UE in a normal subframe may bring a gain in downlink performance.

3. Agreement (Aperiodic SRS Support)

Aperiodic SRS transmission may be supported for additional SRS symbols.

4. Agreement (Transmission of Additional SRS)

A UE configured with an additional SRS in one UL subframe may transmit the SRS based on any one of the following options.
  Option 1: Frequency hopping is supported within one UL subframe.
  Option 2: Repetition within one UL subframe is supported.
  Option 3: Both frequency hopping and repetition are supported within one UL subframe.

5. Agreement

Both intra-subframe frequency hopping and repetition are supported for aperiodic SRS in additional symbols).

6. Agreement (Additional SRS and Antenna Switching)

Antenna switching within a subframe is supported for aperiodic SRS in an additional SRS symbol.

The term additional SRS symbol is additionally introduced in Rel-16 and the last symbol is not part of the additional SRS symbol.

7. Agreement (Transfer of Legacy SRS and Additional SRS)

Both legacy SRS and additional SRS symbol(s) may be configured for the same UE.

If the legacy SRS is aperiodic, the UE may transmit the legacy SRS or additional SRS symbol(s) in the same subframe.

If the legacy SRS is periodic, the UE may transmit the legacy SRS and additional SRS symbol(s) in the same or different subframes.

8. Agreement (Number of Symbols in Additional SRS)

The number of symbols that may be configured in the UE as an additional SRS is 1-13.

In determining future agreements, the following may be considered.

For intra-subframe frequency hopping and repetition of additional SRS symbols

In support of repetition and frequency hopping, the following may be discussed.

$n_{SRS} = \lfloor 1/R \rfloor$ value. Here, $l \in \{0, 1, \ldots, N_{symb}^{SRS}-1\}$ is the number of OFDM symbols.

value of R. $N_{symb}^{SRS}$ $N_{symb}^{SRS}$ is the number of configured SRS symbols, and R is the repetition factor for the configured UE)

Application to non-periodic SRS
  whether legacy SRS and additional SRS symbols have the same hopping pattern
  whether flexible configuration (e.g., comb/comb offset configuration) is supported for repetition of additional SRS symbols 9. Agreement For the temporal position of possible additional SRS (SRS) symbols in one general UL subframe for a cell:
  use 1 to 13 symbols in one subframe for SRS from a cell point of view 10. Agreement (Power Control)

Same power control configuration applies for all additional SRS symbols configured to a single UE.

11. Agreement

Transmission of aperiodic legacy SRS and aperiodic additional SRS symbol(s) in the same subframes for a UE is supported.

12. Agreement

In the case of aperiodic SRS transmission, a combination of the following features may be simultaneously configured.

Intra-subframe antenna switching

Antenna switching is supported over at least all antenna ports.

Whether to support the following matters may be additionally considered.

Antenna switching across a subset of antenna ports

Frequency hopping in subframe (Antenna switching across a subset of antenna ports)

Intra-subframe repetition

It may be considered whether the above-described features are applied only to additional SRS symbols or to legacy SRS symbols.

13. Agreement

In support of SRS repetition $n_{SRS}=\lfloor l/R \rfloor$, the following parameters may be defined. Here, $l \in \{0, 1, \ldots, N_{symb}^{SRS}-1\}$ is the OFDM symbol number, $N_{symb}^{SRS}$ is the number of configured SRS symbols, and R is the repetition factor for the configured UE.

14. Agreement

The configurable number of additional SRS repetitions may be {1, 2, 3, 4, 6, 7, 8, 9, 12, 13}. The configuration may be applied per antenna port and per subband.

15. Agreement (Trigger of SRS Transmission Via DCI's Code Point)

The code point of the same DCI triggers SRS transmission for one of the following:

Only aperiodic legacy SRS symbols

Only aperiodic additional SRS symbols

Both aperiodic legacy and aperiodic additional SRS symbols within the same subframe An association of the codepoint and one of the above may be configured by RRC signaling. In the absence of SRS triggering, a separate codepoint may be supported.

16. Agreement

The size of the SRS request field for triggering the Rel-16 SRS may be the same as that of the conventional (Rel-15 DCI format).

17. Agreement

Only Rel-15 DCI formats that support SRS triggering can be used to trigger Rel-16 SRS transmission.

18. Agreement

In the case of an additional SRS symbol, per-symbol group hopping and sequence hopping may be supported.

In a given time, only one of per-symbol group hopping or sequence hopping can be used by a UE.

19. Agreement

To solve the minimum power change due to frequency hopping or antenna switching for additional SRS symbols, one of the following options may be considered.

Option 1: A guard period of one symbol may be introduced in the RAN1 specifications.

Option 2: No guard period may be introduced in the RAN1 specifications.

In the UL normal subframe of the LTE TDD system up to Rel-15, both a cell-specific SRS for a specific cell and a UE-specific SRS for a specific UE may be configured only in one symbol (last symbol) in one subframe.

As described above, in the Rel-16 LTE MIMO enhancement, only the aperiodic SRS in the additional SRS of the UL normal subframe is preferentially supported.

Unlike legacy SRS, which is transmitted only in the last symbol of the conventional UL normal subframe, the additional SRS may be transmitted through multiple symbols in a symbol position other than the last symbol. Therefore, according to the configuration of the additional SRS, the PUSCHs and the PUCCHs of the UE transmitting the SRS in the time domain and other UEs than the corresponding UE may collide.

Further, as discussed in the agreements (15. Agreement), the base station triggers both a legacy SRS and an additional SRS in the UE through one downlink control information (DCI).

In the case of legacy SRS, if the base station triggers an aperiodic SRS by cell-specific/UE-specific SRS configuration, the timing when the UE is to transmit the aperiodic SRS is determined. In the case of the additional SRS, it is unclear whether to define/configure a cell-specific SRS and, in the configuration of a UE-specific SRS, it is also unclear whether it is configured independently from the legacy SRS. Therefore, ambiguity may occur in the (aperiodic) additional SRS transmission timing of the UE.

Based on this background, in the disclosure, the configuration and transmission method for legacy SRS and/or additional SRS having aperiodic characteristics between the base station and the UE are primarily proposed, and UE/base station operations based on the corresponding configuration and transmission method are described.

A UE to which at least one operation proposed in the disclosure is applied is referred to as an "enhanced UE" for convenience, and includes the cases of configuring/applying/transmitting the additional SRS, like a Rel-16 UE.

Although the description herein focuses primarily on the additional SRS in the LTE system for convenience, this is applicable to all systems for transmitting an SRS in a plurality of symbols, such as 3GPP NR (new RAT, new radio access technology). Further, if the disclosure applies to NR, the subframe and slot structure/unit of the LTE system may be modified and applied to the NR system as shown in Table 3 below.

TABLE 3

| μ | $N_{symb}^{slot}$ | $N_{slot}^{frame}$ | $N_{slot}^{subframe}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 summarizes the number of symbols per slot, the number of symbols per frame, and the number of symbols per subframe according to the parameter μ related to subcarrier spacing.

UE-Specific Aperiodic SRS Configuration Scheme for Additional SRS

In the conventional LTE system, in the case of type 1 SRS triggering, the description of the SRS transmission related to the SRS request field of the DCI may be varied for each DCI format (0B, 3B, 4, 4A, 4B, 7-0B). Thus, the description for SRS transmission is set to differ for each codepoint indicated by the SRS request field, so that the UE may, or may not, transmit SRS depending on the description for SRS transmission indicated by each codepoint.

For example, if the codepoint indicated by the SRS request field is '00', the UE does not transmit the SRS to the base station, and if it is a code point other than '00', the UE may transmit the SRS to the base station using a parameter set according to the description for the SRS transmission indicated by each codepoint or transmission timing or a set of serving cells.

In the LTE Rel-16 standard, additional SRS (additional SRS) transmitted aperiodically may be supported, and accordingly, ambiguity may occur in relation to the aperiodic type 1 SRS triggering method transmitted by the base station and the type 1 SRS transmission method of the UE.

Thus, a type 1 SRS triggering method for additional SRS transmitted to the UE by the base station and a type 1 SRS transmission method of enhanced UE to address the above-described ambiguity are described below.

The legacy SRS and additional SRS described herein may be described or defined as type 1 SRS and type 2 SRS.

The description for legacy SRS and additional SRS transmission expressed in the disclosure may be transmitted from the base station to the UE through RRC signaling. In other words, it may be an RRC configuration configured from the base station.

(Method 1)

In the description for SRS transmission connected (mapped) with the type 1 SRS request field for each DCI format transmitted from the base station to the UE, the description of the additional SRS may be added to the description of the legacy SRS.

When the enhanced UE capable of receiving the configuration for additional SRS transmission receives an SRS transmission request through DCI (UL DCI) related to uplink control information from the base station, the UE needs to determine whether to transmit legacy SRS or additional SRS or both the legacy SRS and the additional SRS, and transmit the SRS. In other words, the base station should determine which SRS transmission (RRC) of description/configuration should be interpreted and notify the UE whether to transmit the SRS based on the description/configuration, and a specific method (operation) therefor is as follows.

In other words, if the UE receives the SRS transmission request, it needs to be clearly determined whether the description/configuration for the legacy SRS transmission or the description/configuration for the additional SRS transmission or the descriptions/configurations for both the legacy SRS transmission and the additional SRS transmission need to be interpreted, and the UE is notified of this by the following method (operation).

For example, a separate RRC parameter for selecting whether to transmit legacy SRS or additional SRS may be defined. More specifically, when the RRC parameter 'additionalSRS' is set to false, the enhanced UE may transmit SRS based on the description indicated by the SRS request field for legacy SRS transmission and, if 'additionalSRS' is set to true, the enhanced UE may transmit SRS based on the description indicated by the SRS request field for additional SRS transmission.

As another method, when the enhanced UE receives an SRS transmission request through DCI (UL DCI) related to uplink control information transmitted from the base station, the UE may define and/or configure a separate RRC parameter for indicating whether to transmit only the legacy SRS to the base station or transmit both the legacy SRS and the additional SRS to the base station.

For example, when the RRC parameter 'additionalSRS' is set to false, the enhanced UE may transmit only the legacy SRS to the base station based on the description of the SRS request field related to the legacy SRS transmission and, if 'additionalSRS' is set to true, the enhanced UE may interpret both the descriptions indicated by the SRS request fields related to the legacy SRS and the additional SRS and, based thereupon, transmit both the legacy SRS and the additional SRS to the base station.

In other words, in method 1, a description related to additional SRS transmission may be separately configured/defined, and the additional SRS may be transmitted using the description. It may be set/indicated through a separate RRC parameter whether to transmit the additional SRS.

Use of the above-described method 1 may reduce ambiguity for additional SRS triggering and allow for more simple and consistent processing between base station and UE.

(Method 2)

In the description for SRS transmission indicated by the type 1 SRS request field for each DCI format transmitted from the base station to the UE, the description of the additional SRS may be added to the description of the legacy SRS. In this case, each DCI format may add a one-bit field indicating whether to trigger legacy SRS transmission or additional SRS transmission. The one-bit field may play a role to switch between triggering of legacy SRS transmission and triggering of additional SRS transmission.

For example, if the one-bit field indicates '0,' the enhanced UE may regard the one-bit field of the DCI as a trigger for legacy SRS transmission and transmit the legacy SRS to the base station. If the one-bit field indicates '1,' the enhanced UE may regard it as a trigger for additional SRS transmission and transmit the additional SRS to the base station.

Although complicating the UE operation a little bit, the method may advantageously allow the base station to perform triggering while dynamically switching between legacy SRS transmission and additional SRS transmission depending on, e.g., when coverage enhancement of SRS is needed or when the UE's capacity needs to be further utilized. In other words, it is possible to flexibly configure SRS transmission by such triggering and to efficiently use resources without waste.

Further, the one-bit field, which indicates whether to trigger legacy SRS transmission or additional SRS transmission, in each DCI format described above may be used to indicate (as an indicator) whether to trigger legacy SRS transmission alone or simultaneously trigger both legacy SRS transmission and additional SRS transmission. For example, if the one-bit field is 0, it may indicate to trigger only legacy SRS transmission and, if 1, it may indicate to simultaneously trigger legacy SRS transmission and additional SRS transmission.

This method produces the effect in which when there are many users allocated to the resource region for legacy SRS transmission, the base station may selectively trigger SRS transmission, to the enhanced UE, between the resource region for legacy SRS transmission and the resource region for additional SRS transmission.

The description for SRS transmission indicated by the type 1 SRS request field for each DCI format transmitted from the base station to the UE is described in greater detail. In each N-bit codepoint indicated by the SRS request field, only the legacy SRS transmission-related description may be configured (connected, mapped), and a legacy SRS transmission-related description and an additional SRS transmission-related description both may be configured. In this case, the above-described one-bit field may be regarded as effective only when the SRS request field indicates a codepoint in which both the legacy SRS transmission-related description and the additional SRS transmission-related description are configured.

Alternatively, the above-described field may be resized from one bit to two bits, providing advantages in light of usability. In other words, it may be indicated, using the 2-bit field, whether to trigger legacy SRS transmission alone, additional SRS transmission alone, or legacy SRS transmission and additional SRS transmission both. This enables dynamic triggering configuration.

For example, if the codepoint indicated by the 2-bit field is '00,' the UE performs only legacy SRS transmission based on only the legacy SRS transmission-related description, if '01,' the UE performs only additional SRS transmission based on only additional SRS transmission-related description, if '10,' the UE transmit both the legacy SRS and the additional SRS to the base station based on both the legacy SRS transmission-related description and the additional SRS transmission-related description. In this case, the codepoint '11' may be reserved. In other words, based on the mapping between each codepoint value indicated by the field and the legacy and/or additional SRS transmission-related description, the UE may perform SRS transmission to the base station. It is obvious that the configuration (mapping) relationship between each codepoint value and the legacy SRS/additional SRS transmission-related description may be set to differ from the above-described example.

In other words, in the request field of the DCI, the legacy and/or additional SRS transmission-related description is mapped, and the UE may interpret the mapped description via a separate 1-bit or 2-bit field, other than the request field, and transmit the SRS.

Meanwhile, if enhanced PUSCH rate matching (e.g., PUSCH rate matching on the resource region for additional SRS transmission) by additional SRS transmission is supported, the 1-bit field of the DCI described above in connection with method 2 may play a role as an indicator that indicate PUSCH rate matching to the UE.

For example, if the one-bit field is set to '0,' the UE regards legacy SRS transmission as having been triggered and transmits the legacy SRS to the base station. Thus, only the legacy SRS is transmitted, and the existing configuration is maintained, and no enhanced PUSCH rate matching is needed. Accordingly, the legacy subframe-PUSCH (e.g., normal PUSCH transmitted on the remaining symbols except for the last symbol of the subframe) is transmitted using the subframe in which SRS is transmitted. In this case, last symbol PUSCH rate matching is performed according to the configuration related to legacy SRS transmission. However, if the one-bit field is set to '1,' the UE regards additional SRS transmission as having been triggered and transmits the additional SRS to the base station. In this case, the UE regards it as an indication for enhanced PUSCH rate matching for SRS transmission using a plurality of symbols and may transmit PUSCH using a reduced number of symbols like slot-PUSCH. In other words, since the additional SRS may be transmitted using a plurality of symbols, the number of symbols conventionally used for PUSCH transmission may be reduced, so that rate matching may be required.

Since additional SRS transmission may be performed using a plurality of symbols, resources for responding (e.g., channel state information reporting or ACK/NACK transmission) to uplink channel and downlink transmission may be insufficient.

Thus, to address this, additional SRS transmission may be configured to be performed only in the resource region on one slot (i.e., the first slot or the last slot) of the uplink normal subframe, and PUSCH transmission using rate matching may be performed in the remaining resource region. As such operation is configured/defined by the above-described one-bit field, a resource region where uplink transmission is performed may be secured, and processing between base station and UE may be more flexibly performed via more dynamic configuration.

(Method 3)

As the description for SRS transmission indicated by the type 1 SRS request field for each DCI format transmitted from the base station to the UE is described in greater detail, the legacy SRS transmission-related description alone or the additional SRS transmission-related description, in addition to the legacy SRS transmission-related description, may be configured/defined for each codepoint of the SRS request field. In other words, it is possible to more flexibly make a configuration related to SRS transmission from the base station to the UE.

For example, in the codepoint '01' of the SRS request field, only the legacy SRS transmission-related description may be configured/defined and, in '01,' the additional SRS transmission-related description may be configured/defined in addition to the legacy SRS transmission-related description. In this case, the enhanced UE may receive the UL DCI from the base station. If the codepoint value of the SRS request field of the UL DCI is '01,' the enhanced UE may regard only legacy SRS transmission as triggered and transmit only the legacy SRS to the base station. If the codepoint value of the SRS request field is '10,' the enhanced UE may regard both legacy SRS transmission and additional SRS transmission as triggered and transmit both the legacy SRS and the additional SRS to the base station. In this case, the codepoint may be the (bit) value of the SRS request field.

In other words, if legacy SRS/additional SRS transmission is triggered by DCI, the value indicated by the SRS request field of the DCI may be connected (mapped) with the SRS parameter set related to SRS transmission (received via RRC signaling) and, in this case, the SRS parameter set may include information for each SRS trigger. Further, legacy SRS and/or additional SRS transmission may be performed based on the SRS parameter set. In other words, the information provided from the SRS parameter set may include the above-described description.

In other words, the codepoint value indicated by the SRS request field of the DCI may be set to be associated (mapped) with both, either, or neither of the legacy SRS transmission-related description and the additional SRS transmission-related description and, based on the description, the UE may, or may not, transmit the legacy and/or additional SRS to the base station. It may be configured that two types (legacy SRS and additional SRS) of SRS transmission are performed in one cell.

In this case, it is obvious that the configuration (mapping) relationship between each codepoint value and the legacy SRS/additional SRS transmission-related description may be set to differ from the above-described example. For example, if the codepoint value is '01,' both legacy SRS transmission and additional SRS transmission may be triggered or additional SRS transmission alone may be triggered.

Method 3 may be considered as having semi-static flexibility as compared with method 2.

Further, if the enhanced UE defines a separate RRC parameter and receives an SRS transmission request by UL DCI, it may be indicated which SRS transmission description (i.e., legacy SRS transmission-related description and/or additional SRS transmission-related description) the UE is to transmit SRS to the base station based on.

(Method 4)

Such an occasion may exist where aperiodic SRS transmission (among a plurality of CCs) is configured in a state in which component carriers (CCs) (i.e., serving cells) more than a specific number M (e.g., M=5) are configured/activated. For example, if the SRS request (field) value of the DCI meets a specific condition, such aperiodic SRS transmission may be configured. Specifically, the DCI may be in DCI format 3B and, in this case, the SRS request value is one for trigger type 1 and an SRS request value for a UE configured with five or more TDD serving cells without PUSCH/PUCCH transmission.

An additional SRS transmission-related description may be configured/defined for each codepoint indicated by the SRS request field value. Each codepoint of the SRS request field may indicate whether to configure/trigger legacy SRS transmission, configure/trigger additional SRS transmission, or configure/trigger both legacy SRS transmission and additional SRS transmission for each of the serving cells more than M. In other words, the base station may configure independent and different configurations/triggers related to SRS transmissions.

Method 4 may be applied to methods 1 to 3 described above, so that the method of triggering SRS transmission may be used even where a plurality of CCs are applied.

Conventionally, from a one-cell perspective, a parameter set (configuration) related to one SRS transmission is connected (configured) to the codepoint indicated by one DCI. For example, according to the 3GPP standards for LTE or post-LTE NR systems, upon SRS antenna switching, a parameter set related to one SRS transmission is connected to one codepoint unless some special cases apply.

In other words, if such a limitation is imposed where only one parameter set related to SRS transmission is connected to one codepoint as conventional, the number of codepoints or DCI formats to which the parameter sets aperiodically transmitted may be connected is limited, which reduce flexibility in connecting several configurations to the DCI and allowing the eNB to trigger to the UE. In other words, conventionally, the size (bit number) of the SRS request field may be incorrect, or a separate DCI format needs to be defined in connecting several configurations to the DCI and allowing the eNB to trigger to the UE.

However, use of the above-described methods described above according to the disclosure enables connection of a plurality of parameter sets related to SRS transmission (e.g., parameter sets related to legacy SRS and additional SRS transmission) in one codepoint, providing advantages in light of flexibility.

Further, when the base station transmits the codepoint to the UE, it is possible to connect only legacy SRS transmission-related parameter sets, only additional SRS transmission-related parameter sets, or both the legacy SRS transmission-relates parameter sets and additional SRS transmission-related parameter sets depending on each codepoint, and such connection may be updated on an RRC level.

If such an update is possible, a parameter set related to SRS transmission connected may be determined according to the number of legacy UEs and enhanced UEs located in a certain cell. For example, if the legacy UE is 'busy,' only additional SRS transmission-related parameters may be connected to the enhanced UE and, as such, it is possible to secure flexibility in light of multiplexing. Or, unless the legacy UE is 'busy,' an update may be performed to connect the parameter sets related to both the legacy SRS transmission and additional SRS transmission. In other words, it is possible to simultaneously obtain a downlink channel and meet uplink adaptation using parameter sets related to a plurality of SRS transmissions.

Hereinafter, matters related to transmission timing of legacy SRS/additional SRS triggered through DCI are described.

(Method 5)

As described above, the base station may trigger SRS transmission to the UE through one codepoint through DL/UL DCI. The SRS may be based on at least one of a legacy SRS or an additional SRS. In other words, the base station may trigger only legacy SRS (legacy SRS), only additional SRS, or both legacy SRS and additional SRS.

The transmission timing of the SRS triggered as above is described in detail below.

The base station may trigger SRS through one codepoint of an SRS request field (i.e., 1 to 3 bits) in DL or UL DCI. Through the codepoint, at least one of a legacy SRS (legacy SRS) or an additional SRS may be triggered, or neither of the two SRSs may be triggered.

Since an agreement on the SRS transmission timing from the trigger time of an additional SRS having aperiodic characteristics has not been reached, the SRS transmission timing needs to be specifically determined.

In particular, in the case of DCI format OA, which is UL DCI, the SRS request field is merely 1 bit. Therefore, it is impossible to dynamically trigger a legacy SRS and/or additional SRS in a manner of varying the different RRC description based on one codepoint.

Based on this background, the disclosure proposes a triggering method for legacy/additional SRS between a base station and a UE, SRS transmission timing, and subsequent UE operations.

Hereinafter, the transmission timing of aperiodic legacy SRS may be assumed to be based on the above-described conventional scheme. In particular, the embodiments described below may be related to the transmission timing of the additional SRS primarily in the case where i) the aperiodic additional SRS alone is triggered or ii) the legacy SRS and aperiodic additional SRS are simultaneously triggered.

(Proposal 1)

If there is a cell-specific and/or UE-specific configuration for additional SRS in an enhanced UE, additional SRS-related UE/base station operations may be performed as follows.

(Proposal 1.1)

Cell-specific and/or UE-specific configuration for additional SRS may follow legacy SRS configuration. As an example, a UE-specific configuration parameter of an additional SRS may be shared with a UE-specific configuration parameter of a legacy SRS. As another example, parameters, such as UE-specific periodic characteristics and offsets of additional SRSs may be the same as parameters of legacy SRSs.

In this case, the UE/base station may operate based on at least one of the following options.

Option 1)

The UE may transmit an SRS based on method 3 described above. Specifically, the UE may perform SRS transmission based on the RRC description of the corresponding codepoint of the SRS request field of the DCI that triggered the SRS. Specifically, the UE may transmit at least one of additional SRS or legacy SRS or may transmit no SRS (no SRS transmission/only legacy SRS/only additional SRS/both legacy and additional SRS).

In this case, the transmission timing of the triggered SRS (legacy SRS and/or additional SRS) may be defined/determined by the legacy UE-specific SRS configuration (i.e., SRS transmission period (e.g., SRS periodicity) or SRS transmission offset (e.g., SRS subframe offset)).

The UE may transmit a legacy SRS and/or an additional SRS based on the timing. For example, if the UE detects a positive SRS request in subframe n (or slot 2n or slot 2n+1), the UE may transmit the legacy SRS and/or additional SRS in the first subframe that complies with UE-specific SRS configurations after subframe n+k (e.g., k=4 or k determined according to the UE capability) (i.e., SRS transmission period (e.g., SRS periodicity) or SRS transmission offset (e.g., SRS function offset)).

The operation according to the present embodiment may simplify the SRS integration configuration in terms of the base station/UE by configuring the additional SRS configuration to depend on the legacy SRS configuration. Accordingly, it is possible to reduce the complexity of the base station/UE operation.

In this case, if SRS transmission is triggered through the RRC description of each codepoint like in option 1 when the SRS request field merely amounts to one bit as in DCI format 0A which is UL DCI, dynamic switching between trigger target (legacy SRS)/additional SRS/legacy SRS and additional SRS is impossible.

Specifically, in the case of DCI format 0A, only semi-static switching (e.g., updating the RRC description of each codepoint in the SRS request field of DCI through RRC reconfiguration) is possible for the SRS to be triggered, and dynamic switching is impossible.

Therefore, the base station may define/set a different RRC configuration/description for each downlink control information format (DCI format) capable of triggering the SRS to the UE. For example, an RRC configuration/description may be defined/configured to trigger any one of only legacy SRS, only additional SRS or both legacy and additional SRS for each DCI format. Through this, the base station may dynamically trigger a legacy SRS and/or an additional SRS, and the flexibility of SRS transmission may be enhanced.
(Proposal 1.2)

When a cell-specific and/or UE-specific configuration for additional SRS does not follow the legacy SRS configuration and is independently (or separately) configured (e.g., RRC and/or MAC-CE), at least one of the options below may be followed.
Option 2)

The UE may transmit an SRS based on method 3 described above. Specifically, the UE may perform SRS transmission based on the RRC description of the corresponding codepoint of the SRS request field of the DCI that triggered the SRS. Specifically, the UE may transmit at least one of additional SRS or legacy SRS or may transmit no SRS (no SRS transmission/only legacy SRS/only additional SRS/both legacy and additional SRS).

In this case, the transmission timing of the triggered SRS (legacy SRS and/or additional SRS) may be determined based on independent configurations. The transmission timing of the legacy SRS may be defined/determined based on a legacy UE-specific SRS configuration (i.e., a legacy SRS transmission period or a legacy SRS transmission offset). The transmission timing of the additional SRS may be defined/determined according to an additional UE-specific SRS configuration (i.e., an additional SRS transmission period or an additional SRS transmission offset).

The UE may transmit a legacy SRS and/or an additional SRS based on the timing. For example, if a legacy SRS is triggered, the UE transmits legacy SRS at the SRS transmission timing based on the legacy UE-specific SRS configuration. If an additional SRS is triggered, the UE transmits an additional SRS at the SRS transmission timing based on the corresponding additional UE-specific SRS configuration. If a legacy SRS and an additional SRS are configured at the same time, the UE may transmit the legacy SRS and the additional SRS at SRS transmission timings based on a legacy UE-specific SRS configuration and an additional UE-specific SRS configuration independent from each other.

In the operation according to the present embodiment, since the base station separately configures legacy SRS (legacy SRS) and additional SRS, transmission of each SRS does not affect the other. Therefore, the base station-UE operation may be flexibly performed in SRS transmission.
Option 3)

The UE may transmit an SRS based on method 3 described above. Specifically, the UE may perform SRS transmission based on the RRC description of the corresponding codepoint of the SRS request field of the DCI that triggered the SRS. Specifically, the UE may transmit at least one of additional SRS or legacy SRS or may transmit no SRS (no SRS transmission/only legacy SRS/only additional SRS/both legacy and additional SRS).

In this case, the transmission timing of the triggered SRS (legacy SRS and/or additional SRS) may be based on independent configurations as in option 2. However, according to the triggered SRS, the UE may operate as follows.

When only legacy SRS or additional SRS is triggered, the UE may transmit SRS based on an independent configuration as in option 2 above. The transmission timing of each SRS may be defined by an independent legacy UE-specific SRS configuration (i.e., legacy SRS transmission period or legacy SRS transmission offset) and additional UE-specific SRS configuration (i.e., additional SRS transmission period or additional SRS transmission offset).

When the legacy SRS and the additional SRS are triggered together, the UE may transmit the SRS based on a specific subframe after the subframe (e.g., subframe n) in which a positive SRS request is detected.

According to an embodiment, the specific subframe may be an earliest UE-specific SRS subframe after subframe n+k (e.g., k=4 or k determined according to the UE capability) in the case where the UE detects the positive SRS request in subframe n (or slot 2n or slot 2n+1).

The UE transmits the SRS according to the configuration related to the specific subframe. The specific subframe may be based on a configuration according to any one of i) to iii) below.
  i) legacy UE-specific SRS configuration
  ii) additional UE-specific SRS configuration
  iii) legacy UE-specific configuration and additional UE-specific SRS configuration In other words, the SRS, the transmission target, may be changed according to which configuration the specific subframe is based on. The UE may determine the transmission target SRS considering the configuration of the specific subframe. Specifically, the UE may determine whether to transmit legacy SRS/additional SRS/transmit both legacy SRS and additional SRS. The UE may transmit the determined SRS.

Through the above-described operation, the SRS (only legacy SRS/only additional SRS/both legacy and additional SRS) may be dynamically triggered according to the attribute of the UE-specific SRS configuration.

(Proposal 2)

If there is no cell-specific and/or UE-specific configuration for additional SRS in an enhanced UE, additional SRS-related UE/base station operations may be based on at least one of the following options. However, the options below may be independently applied to the base station/UE operation irrespective of the above-described condition (the condition in which there is no configuration for additional SRS of the enhanced UE).

Option 4)

The UE may transmit an SRS based on method 3 described above. Specifically, the UE may perform SRS transmission based on the RRC description of the corresponding codepoint of the SRS request field of the DCI that triggered the SRS. Specifically, the UE may transmit at least one of additional SRS or legacy SRS or may transmit no SRS (no SRS transmission/only legacy SRS/only additional SRS/both legacy and additional SRS).

The legacy SRS may be transmitted at a timing based on a legacy UE-specific SRS configuration.

The transmission timing of the additional SRS may be based on the legacy UE-specific SRS configuration. In other words, although there is no independent UE-specific SRS configuration for the additional SRS, the additional SRS may be transmitted at a timing based on a legacy UE-specific SRS configuration.

For example, if only additional SRS is triggered by DCI, the UE may transmit additional SRS in a UE-specific SRS subframe by legacy configuration. Additionally, if the legacy SRS and the additional SRS are triggered together by the DCI, the UE may simultaneously transmit two types of SRSs (legacy SRS and additional SRS) in a UE-specific SRS subframe based on the legacy configuration.

In an operation according to the instant embodiment, the complexity of the configuration between the base station and the UE and the complexity of the UE operation may be reduced by arranging the transmission timing of the additional SRS together with the transmission timing of the legacy SRS.

Option 5)

The UE may transmit an SRS based on method 3 described above. Specifically, the UE may perform SRS transmission based on the RRC description of the corresponding codepoint of the SRS request field of the DCI that triggered the SRS. Specifically, the UE may transmit at least one of additional SRS or legacy SRS or may transmit no SRS (no SRS transmission/only legacy SRS/only additional SRS/both legacy and additional SRS).

The legacy SRS may be transmitted at a timing based on a legacy UE-specific SRS configuration.

The additional SRS may be transmitted in a specific subframe after the UE detects a positive SRS request. For example, the specific subframe may be an uplink (UL) subframe. The specific subframe may be an uplink (UL) subframe after subframe n+k (e.g., k=4 or k determined according to the UE capability) in the case where the UE detects the positive SRS request in subframe n (or slot 2n or slot 2n+1).

(Proposal 3)

When the transmission timing of an additional SRS and the transmission timing of another uplink channel (e.g., PUCCH, PUSCH, PRACH, another SRS (UpPTS symbols)) in the enhanced UE collide, the following method may be considered.

(Proposal 3.1)

If the transmission timing of an additional SRS and the transmission timing of another uplink channel (e.g., PUCCH, PUSCH, PRACH, another SRS (UpPTS symbols)) are set to be the same in the enhanced UE, the additional SRS and the other uplink channel may collide in one subframe. Here, the collision may mean that the transmission timing (e.g., subframe) of the additional SRS and the transmission timing (e.g., subframe) of the other uplink channel wholly or partially overlap. Accordingly, the collision may include a symbol level collision within one subframe.

When the collision occurs as described above, the UE may change the transmission timing of the additional SRS to an uplink (UL) subframe after the original transmission timing.

Specifically, in the case where the UE detects the positive SRS request in subframe n (or slot 2n or slot 2n+1), the transmission timing of the additional SRS may be subframe n+k (e.g., k=4 or k determined according to the UE capability). The UE may prevent collision by shifting/delaying/postponing the transmission timing of the additional SRS to an uplink subframe (i.e., subframe n+k) after subframe n+k and may transmit the additional SRS.

If a collision with another uplink channel occurs even in the uplink subframe (subframe n+k) after subframe n+k, the UE may shift/delay/postpone the transmission timing of the additional SRS to the subsequent uplink subframe and transmit the additional SRS. The UE may repeat the operation (changing or delaying the transmission timing) depending on whether collision occurs due to the changed/delayed transmission timing (if collision continues).

(Proposal 3.2)

When an additional SRS and another uplink channel (e.g., PUCCH, PUSCH, PRACH, another SRS (UpPTS symbols)) collide in one subframe (or at the symbol level within one subframe), the UE may change the transmission timing of the additional SRS as follows.

In the case where the UE detects the positive SRS request in subframe n (or slot 2n or slot 2n+1), the transmission timing of the additional SRS may be subframe n+k (e.g., k=4 or k determined according to the UE capability).

The UE shifts/delays/postpones the transmission timing of the additional SRS to a UE-specific SRS subframe after subframe n+k (i.e., except for subframe n+k) (corresponding to a legacy SRS or additional SRS) and transmits the additional SRS. If a collision with another uplink channel occurs even in the UE-specific SRS subframe (except for subframe n+k) after subframe n+k, the UE may shift/delay/postpone the transmission timing of the additional SRS to the subsequent UE-specific SRS subframe and transmit the additional SRS. The UE may repeat the operation (changing or delaying the transmission timing) depending on whether collision occurs due to the changed/delayed transmission timing (if collision continues).

Proposals 3.1 and 3.2 define an operation for preferential transmission of the uplink channel by giving a lower priority to the additional SRS in the case where the timing when the UE is to transmit the additional SRS is set to an early time (e.g., proposals 1 and 2 of method 5 above) but an uplink channel other than the additional SRS is scheduled/set/indicated at the corresponding timing (in the corresponding subframe). Transmission of the additional SRS is delayed to a valid subframe (where no collision occurs with another uplink channel) capable of transmitting additional SRS after the initial timing. The UE may transmit an additional SRS in the valid subframe.

The operation according to the above embodiment may be more usefully applied when the purpose of other uplink channels (e.g., PUCCH, PUSCH, PRACH, another SRS (UpPTS symbols)) is considered more important than the purpose of the additional SRS to obtain downlink channel state information (DL CSI) through downlink/uplink reciprocity.

In proposals 3.1 and 3.2 above, the base station performs scheduling on the additional SRS and the other uplink channel and may thus grasp the timing when the SRS and the other uplink channel collide and may grasp the subframe/time when the UE is to transmit the additional SRS as the timing of the additional SRS is shifted/delayed/postponed after the collision.

In proposals 3.1 and 3.2, the number n of collisions between additional SRS and other uplink channels is limited so that if the number of collisions exceeds n (e.g., n=5), the UE may abandon and drop transmission of the additional SRS. The number of collisions may be referred to as the number of delays in transmission of the additional SRS. In other words, if the transmission of the additional SRS is delayed n times (e.g., 5 times), the transmission of the additional SRS may be dropped. The operation according to the present embodiment may prevent a complicated operation between the base station and the UE and indiscriminate waste of resources.

(Proposal 3.3)

The operations of proposals 3.1 and 3.2 may be extended to an intra-band CA or inter-band CA situation.

Even in the case where the additional SRS to be transmitted in some serving cell collides with another uplink channel (e.g., PUCCH, PUSCH, PRACH, another SRS (UpPTS symbols)) to be transmitted in another cell, the operations of proposals 3.1 and 3.2 may also be applied to the transmission timing of the additional SRS.

Specifically, in a cell group (e.g., a master cell group (MCG), a secondary cell group (SCG)), the UE operations for collision between the additional SRS and another uplink channel in proposals 3.1 and 3.2 may also apply.

In contrast, in a cell combination capable of simultaneous transmission between the additional SRS and another uplink channel in some UE, the UE may perform simultaneous transmission of the additional SRS and the other uplink channel without performing the operation of shifting the transmission timing of the additional SRS in proposals 3.1 and 3.2 is not performed. For example, if simultaneous transmission of a first cell group and a second cell group is possible in some UE (e.g., MCG and SCG), the UE may simultaneously transmit the additional SRS of the first cell group and the other uplink channel of the second cell group.

Hereinafter, the operation of the UE based on at least one of the above-described methods 1 to 5 is described.

Step 0) receives SRS configuration
  Step 0-1) receives configuration to transmit SRS in one or more symbol
    Step 0-1-1) information that may be included in the configuration is (36.331 SoundingRS-UL-Config)
  Step 0-2) SRS may be transmitted periodically or aperiodically
Step 1) receives DL/UL DCI (through PDCCH) and triggers additional SRS
  Step 11) UL grant may include PUSCH scheduling information
  Step 1-2) may receive DCI (UL/DL) triggering additional SRS separately from the UL grant for scheduling PUSCH (additional SRS may be aperiodic (in one time instance)).

Step 2) transmits additional SRS
  Step 2-1) transmission at the transmission timing of additional SRS (e.g., method 5 proposal 1/proposal 2)
  Step 2-2) if the trigger time is n, if the additional SRS to be transmitted in the UL subframe after subframe n+k (e.g., k=4 or k determined according to UE capability) collides with another uplink channel
    Step 2-1-1) transmits additional SRS based on proposal 3

Not all of the above steps are essential, and some steps may be omitted or added depending on the situation of the UE.

Hereinafter, the effects of the operation according to proposals 1 to 3 of above-described method 5 are described in detail.

In proposals 1 and 2, the transmission timing of additional SRS is defined in the case where an independent cell-specific SRS configuration for additional SRS and/or UE-specific SRS configuration exist or does not exist. The legacy SRS is transmitted based on the legacy configuration, and the additional SRS transmission timing is clearly defined. Thus, ambiguity in the operation of the UE does not occur in determining the SRS transmission timing.

Proposal 3 defines the operation of changing the transmission timing of the additional SRS when an additional SRS with a multi-symbol property with a high chance of collision with another uplink channel collides with another uplink channel. According to proposal 3, another uplink channel is transmitted preferentially, and the additional SRS is transmitted according to the changed transmission timing. Accordingly, collision between the additional SRS and other uplink channel may be prevented, and reliability of the additional SRS transmission may be secured.

In terms of implementation, operations (e.g., operations related to transmission of a sounding reference signal based on at least one of method 1 to method 5) of the base station/UE according to the above-described embodiments may be processed by the device (e.g., the processors 102 and 202 of FIG. 13) of FIGS. 12 to 16 described below.

Figure 13:
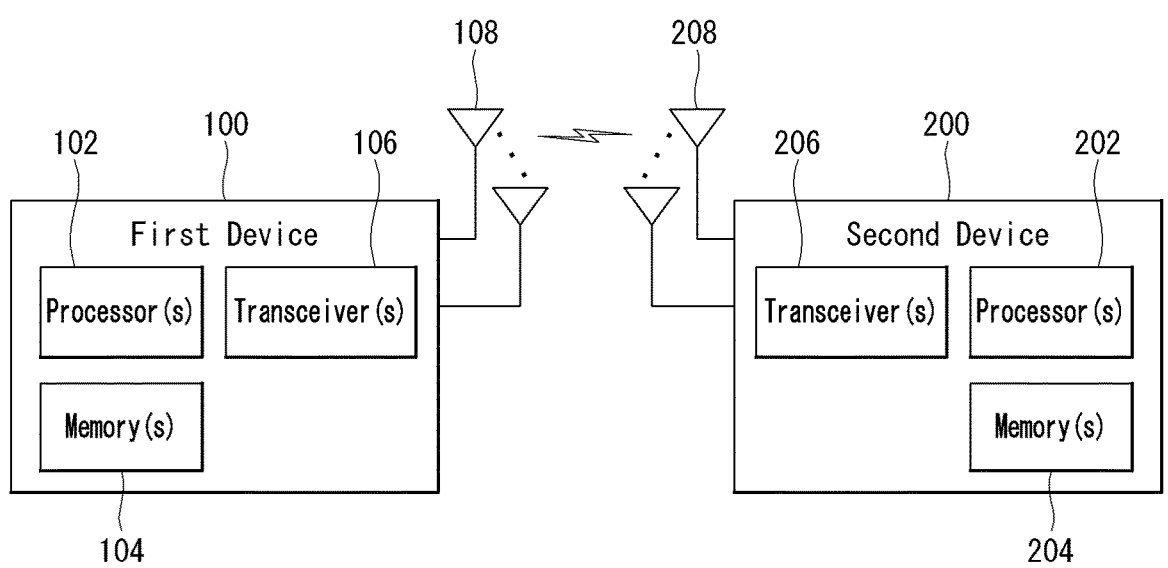
FIG. 13 illustrates an example of a wireless device applicable to the disclosure.

Further, operations (e.g., operations related to transmission of a sounding reference signal based on at least one of method 1 to method 5) of the base station/UE according to the above-described embodiment may be stored in a memory (e.g., 104 or 204 of FIG. 13) in the form of instruction/program (e.g., instructions, executable codes) for driving at least one processor (e.g., 102 or 202 of FIG. 13).

The operations of a UE based on the above-described embodiments are described below in detail with reference to FIG. 9.

Figure 9:
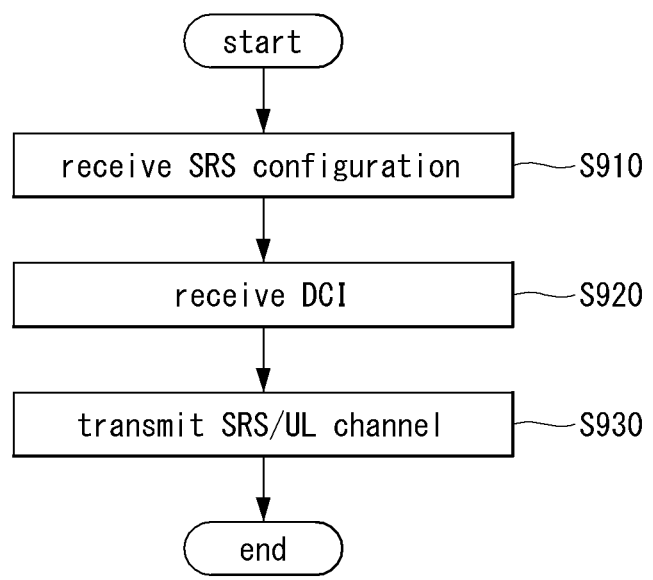
FIG. 9 is a flowchart for describing the operation of a UE to which a method proposed in the disclosure may be applied.

FIG. 9 is a flowchart for describing the operation of a UE to which a method proposed in the disclosure is applied. FIG. 9 is intended merely for illustration purposes but not for limiting the scope of the disclosure.

Referring to FIG. 9, it is assumed that the UE performs uplink transmission (e.g., uplink channel, additional SRS, etc.) based on the schemes described in method 1 to method 5 described above.

The UE may receive an SRS configuration from, e.g., the base station (S910). For example, as in step 0) in the above-described UE operations, the UE may receive an SRS configuration including information related to SRS (e.g., additional SRS, UpPts SRS) transmission.

The UE may receive DCI related to transmission of, e.g., the SRS and/or uplink channel (S920). For example, the corresponding DCI may correspond to the DL/UL DCI (e.g., step 1) based on the above-described methods.

Thereafter, the UE may transmit SRS and/or uplink channel(s) based on the received SRS configuration, DCI, and/or previously defined rules (e.g., priority rule, etc.) (S930). Here, the DCI may include information related to triggering of an additional SRS, and the additional SRS may be transmitted aperiodically (in one time instance).

As an example, if a collision occurs between the additional SRS and another uplink channel(s)/a different type of SRS (e.g., UpPTS SRS), the UE may transmit SRS and/or uplink channel(s) according to the rules (e.g., proposal 3 of step 2-1-1) described above in connection with method 5.

It is obvious that the reception operation of the UE in FIG. 9 may be understood as the transmission operation of the base station, and the transmission operation of the UE may be understood as the reception operation of the base station.

The above-described embodiments are described below in detail with reference to FIG. 10 in terms of the operation of the UE. Further, the embodiments and/or methods described in the disclosure are differentiated solely for ease of description, and some components in any one method may be replaced, or combined with components of another method.

Figure 10:
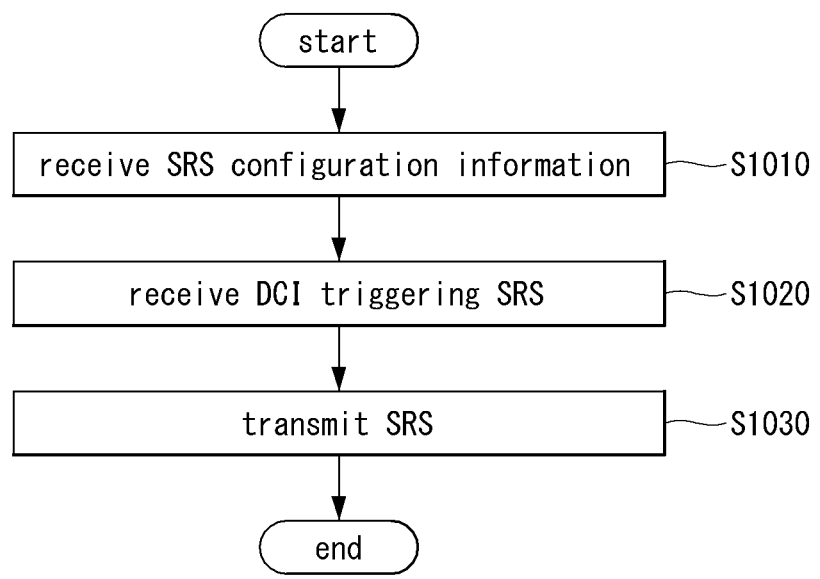
FIG. 10 is a flowchart illustrating a method for transmitting a sounding reference signal by a UE in a wireless communication system according to an embodiment of the disclosure.

FIG. 10 is a flowchart illustrating a method for transmitting a sounding reference signal by a UE in a wireless communication system according to an embodiment of the disclosure.

Referring to FIG. 10, a method for transmitting a sounding reference signal by a UE in a wireless communication system according to an embodiment of the disclosure may include a step of receiving SRS configuration information (S1010), a step of receiving a DCI which triggers an SRS (S1020), and a step of transmitting an SRS (S1030).

In S1010, the UE receives configuration information related to transmission of a sounding reference signal (SRS) from a base station.

The operation of receiving configuration information related to transmission of the sounding reference signal (SRS) by the UE (100/200 of FIGS. 12 to 16) from the base station (100/200 of FIGS. 12 to 16) according to S1010 described above may be implemented by the device of FIGS. 12 to 16. For example, referring to FIG. 13, one or more processors 102 may control one or more transceivers 106 and/or one or more memories 104 to receive the configuration information related to transmission of the sounding reference signal (SRS) from the base station 200.

In S1020, the UE receives downlink control information (DCI) which triggers transmission of the SRS from the base station.

According to an embodiment, the SRS may be based on at least one of a first SRS or a second SRS configured in an area different from the first SRS. The first SRS may be a legacy SRS or a basic SRS. The second SRS may be an additional SRS.

According to an embodiment, the first SRS may be configured in a last symbol of a subframe, and the second SRS is configured in an area except for the last symbol in the subframe. In this case, the subframe may not be a special subframe (e.g., UpPTS).

According to the above-described S1020, the operation of the UE (100/200 of FIGS. 12 to 16) receiving the downlink control information (DCI) which triggers the transmission of the SRS from the base station (100/200 of FIGS. 12 to 16) may be implemented by the device of FIGS. 12 to 16. For example, referring to FIG. 13, one or more processors 102 may control one or more transceivers 106 and/or one or more memories 104 to receive the downlink control information (DCI) triggering transmission of the SRS from the base station 200.

In S1030, the UE transmits the SRS to the base station.

According to an embodiment, the second SRS may be transmitted based on a configuration related to the transmission timing (e.g., subframe) of the first SRS. Specifically, a cell-specific and/or UE-specific configuration for the second SRS may follow the configuration of the first SRS.

As an example, a UE-specific configuration parameter of the second SRS may be shared with a UE-specific configuration parameter of the first SRS. As another example, parameters, such as UE-specific periodic characteristics and offsets of the second SRS, may be the same as the parameters of the first SRS. This embodiment may be based on proposal 1.1 described above.

The configuration related to the transmission timing of the first SRS may be based on a UE-specific configuration. The UE-specific configuration may be related to at least one of a transmission period (e.g., SRS periodicity) and a transmission offset (e.g., SRS subframe offset).

According to an embodiment, the second SRS may be transmitted in a specific subframe. The specific subframe may be based on an uplink subframe after the subframe in which the DCI is detected. The specific subframe may be based on option 1 of proposal 1.1.

According to an embodiment, the second SRS may be delayed and transmitted based on the specific subframe wholly or partially overlapping a resource region in which another uplink channel is transmitted. This embodiment may be based on proposal 3 described above.

The other uplink channel may include a Physical Uplink Control Channel (PUCCH), a Physical Uplink Shared Channel (PUSCH), a Physical Random Access Channel (PRACH) or another sounding reference signal (SRS) (UpPTS symbols).

The second SRS may be transmitted in an uplink subframe after the specific subframe. The uplink subframe after the specific subframe may be a subframe based on a configuration related to at least one of the transmission timing of the first SRS and the transmission timing of the second SRS. This embodiment may be based on proposal 3.2 described above.

When a subframe in which the delayed transmission of the second SRS is performed wholly or partially overlaps a resource region in which another uplink channel is transmitted, the second SRS may be redelayed and transmitted. In other words, if transmission of the second SRS according to the changed transmission timing collides with another uplink channel, the transmission timing of the second SRS may be delayed/changed again. In this case, the transmission of the second SRS may be dropped based on a number of times of delay of the transmission of the second SRS exceeding a predetermined value.

According to the above-described S1030, the operation of the UE (100/200 of FIGS. 12 to 16) transmitting the SRS to the base station (100/200 of FIGS. 12 to 16) may be implemented by the device of FIGS. 12 to 16. For example, referring to FIG. 13, one or more processors 102 may control one or more transceivers 106 and/or one or more memories 104 to transmit the SRS to the base station 200.

The above-described embodiments are described below in detail with reference to FIG. 11 in terms of the operation of the base station. Further, the embodiments and/or methods described in the disclosure are differentiated solely for ease of description, and some components in any one method may be replaced, or combined with components of another method.

Figure 11:
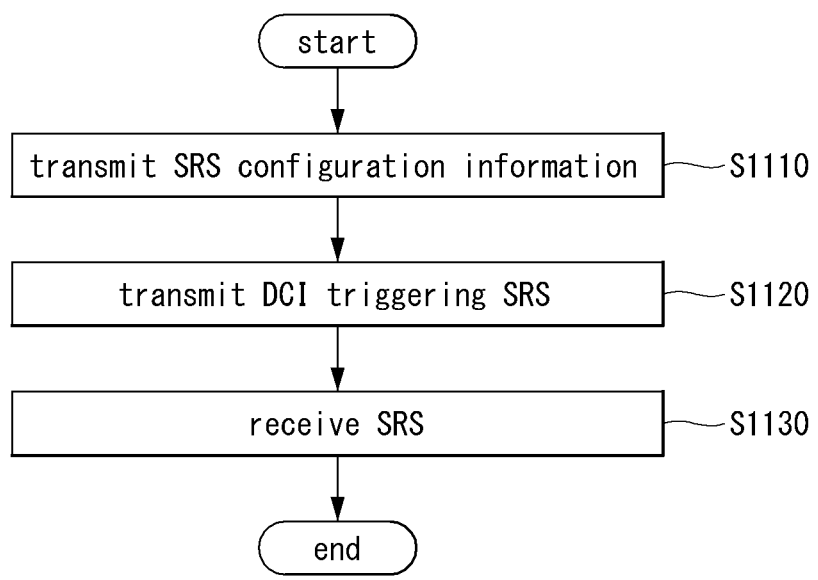
FIG. 11 is a flowchart illustrating a method for receiving a sounding reference signal by a base station in a wireless communication system according to another embodiment of the disclosure.

FIG. 11 is a flowchart illustrating a method for receiving a sounding reference signal by a base station in a wireless communication system according to another embodiment of the disclosure.

Referring to FIG. 11, a method for receiving a sounding reference signal by a base station in a wireless communication system according to another embodiment of the disclosure may include a step of transmitting an SRS configuration information (S1110), a step of transmitting a DCI which triggers an SRS (S1120), and a step of receiving an SRS (S1130).

In S1110, the base station transmits configuration information related to transmission of a sounding reference signal (SRS) to the UE.

The operation of transmitting configuration information related to transmission of the sounding reference signal (SRS) by the base station (100/200 of FIGS. 12 to 16) to the UE (100/200 of FIGS. 12 to 16) according to S1110 described above may be implemented by the device of FIGS. 12 to 16. For example, referring to FIG. 13, one or more processors 202 may control one or more transceivers 206 and/or one or more memories 204 to transmit the configuration information related to transmission of the sounding reference signal (SRS) to the UE 100.

In S1120, the base station transmits downlink control information (DCI) which triggers transmission of the SRS to the UE.

According to an embodiment, the SRS may be based on at least one of a first SRS or a second SRS configured in an area different from the first SRS. The first SRS may be a legacy SRS or a basic SRS. The second SRS may be an additional SRS.

According to an embodiment, the first SRS may be configured in a last symbol of a subframe, and the second SRS is configured in an area except for the last symbol in the subframe. In this case, the subframe may not be a special subframe (e.g., UpPTS).

According to the above-described S1120, the operation of the base station (100/200 of FIGS. 12 to 16) transmitting the downlink control information (DCI) which triggers the transmission of the SRS to the UE (100/200 of FIGS. 12 to 16) may be implemented by the device of FIGS. 12 to 16. For example, referring to FIG. 13, one or more processors 202 may control one or more transceivers 206 and/or one or more memories 204 to transmit the downlink control information (DCI) triggering transmission of the SRS to the UE 100.

In S1130, the base station receives the SRS from the UE.

According to an embodiment, the second SRS may be transmitted based on a configuration related to the transmission timing (e.g., subframe) of the first SRS. Specifically, a cell-specific and/or UE-specific configuration for the second SRS may follow the configuration of the first SRS.

As an example, a UE-specific configuration parameter of the second SRS may be shared with a UE-specific configuration parameter of the first SRS. As another example, parameters, such as UE-specific periodic characteristics and offsets of the second SRS, may be the same as the parameters of the first SRS. This embodiment may be based on proposal 1.1 described above.

The configuration related to the transmission timing of the first SRS may be based on a UE-specific configuration. The UE-specific configuration may be related to at least one of a transmission period (e.g., SRS periodicity) and a transmission offset (e.g., SRS subframe offset).

According to an embodiment, the second SRS may be transmitted in a specific subframe. The specific subframe may be based on an uplink subframe after the subframe in which the DCI is detected. The specific subframe may be based on option 1 of proposal 1.1.

According to an embodiment, the second SRS may be delayed and transmitted based on the specific subframe wholly or partially overlapping a resource region in which another uplink channel is transmitted. This embodiment may be based on proposal 3 described above.

The other uplink channel may include a Physical Uplink Control Channel (PUCCH), a Physical Uplink Shared Channel (PUSCH), a Physical Random Access Channel (PRACH) or another sounding reference signal (SRS) (UpPTS symbols).

The second SRS may be transmitted in an uplink subframe after the specific subframe. The uplink subframe after the specific subframe may be a subframe based on a configuration related to at least one of the transmission timing of the first SRS and the transmission timing of the second SRS. This embodiment may be based on proposal 3.2 described above.

When a subframe in which the delayed transmission of the second SRS is performed wholly or partially overlaps a resource region in which another uplink channel is transmitted, the second SRS may be redelayed and transmitted. In other words, if transmission of the second SRS according to the changed transmission timing collides with another uplink channel, the transmission timing of the second SRS may be delayed/changed again. In this case, the transmission of the second SRS may be dropped based on a number of times of delay of the transmission of the second SRS exceeding a predetermined value.

The operation of receiving the SRS by the base station (100/200 of FIGS. 12 to 16) from the UE (100/200 of FIGS. 12 to 16) according to S1130 described above may be implemented by the device of FIGS. 12 to 16. For example, referring to FIG. 13, one or more processors 202 may control one or more transceivers 206 and/or one or more memories 204 to receive the SRS from the UE 100.

Example of Communication System Applied to Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
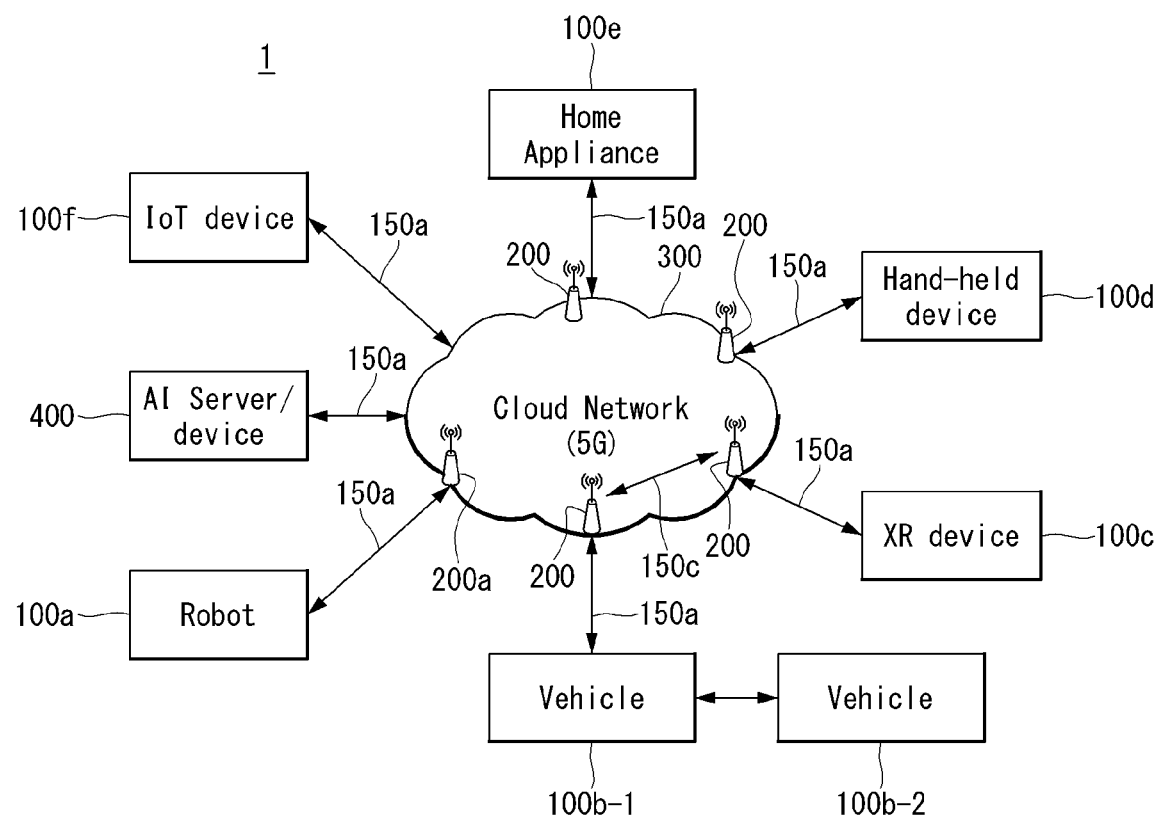
FIG. 12 illustrates an example of a communication system 1 applied to the disclosure.

FIG. 12 illustrates a communication system 1 applied to the disclosure.

Referring to FIG. 12, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Example of Wireless Device Applied to the Disclosure.

FIG. 13 illustrates wireless devices applicable to the disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to being driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Disclosure

Figure 14:
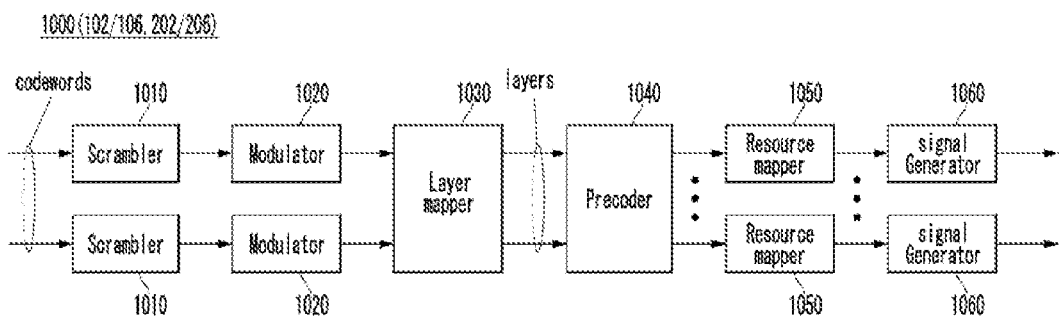
FIG. 14 illustrates an example of a signal processing circuit applied to the disclosure.

FIG. 14 illustrates a signal process circuit for a transmission signal.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Disclosure

Figure 15:
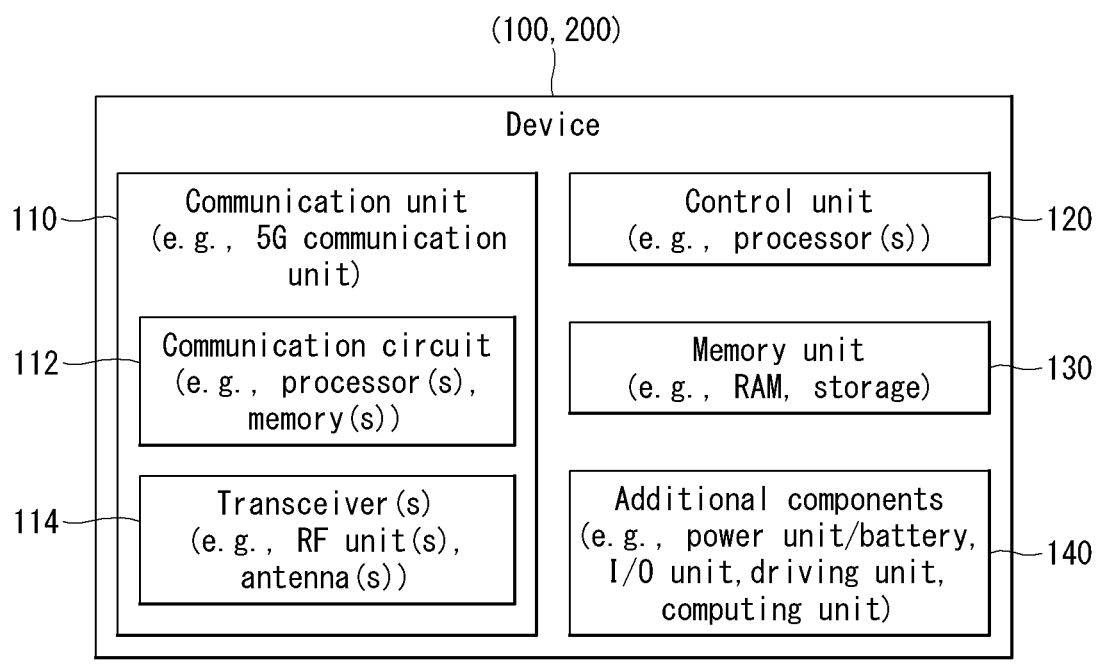
FIG. 15 illustrates another example of a wireless device applied to the disclosure.

FIG. 15 illustrates another example of a wireless device applied to the disclosure.

The wireless device may be implemented in various forms according to a use-case/service (refer to FIG. 12). Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 12), the vehicles (100*b*-1 and 100*b*-2 of FIG. 12), the XR device (100*c* of FIG. 12), the hand-held device (100*d* of FIG. 12), the home appliance (100*e* of FIG. 12), the IoT device (100*f* of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Disclosure

Figure 16:
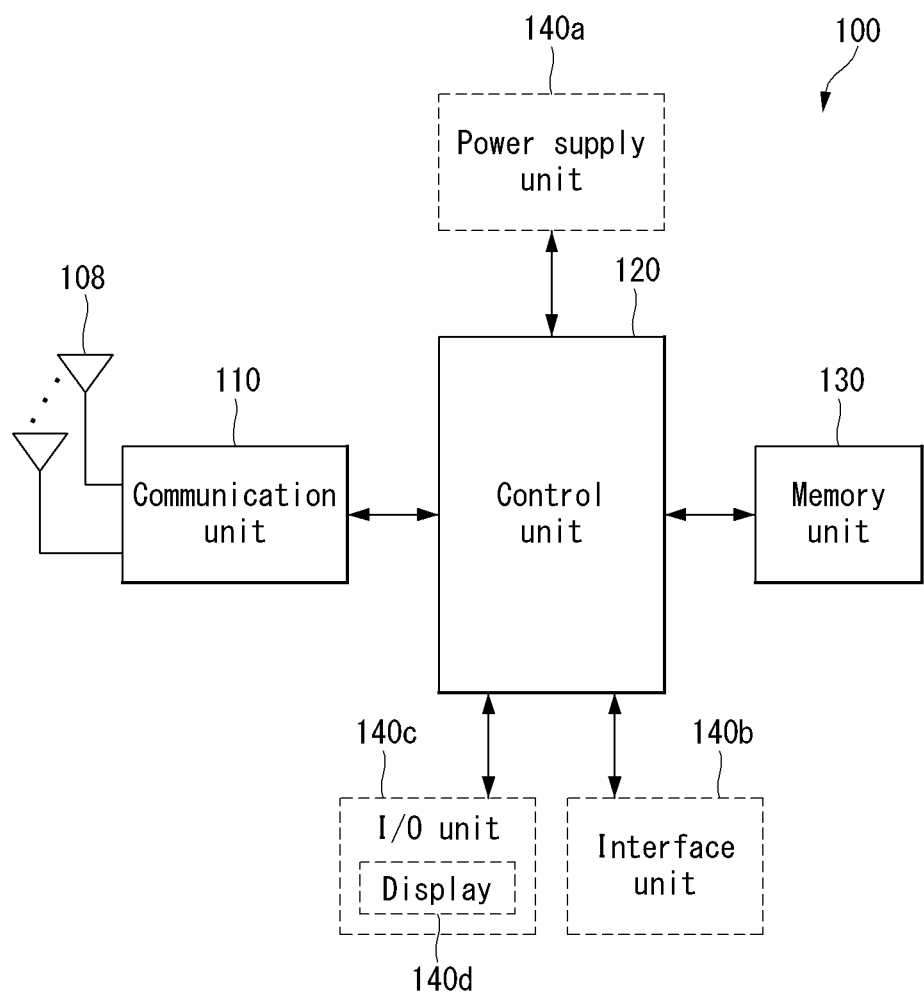
FIG. 16 illustrates an example of a portable device applied to the disclosure.

FIG. 16 illustrates a hand-held device applied to the disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 16, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

The sounding reference signal transmission/reception method and device in a wireless communication system according to embodiments of the disclosure provide the following effects.

According to an embodiment of the disclosure, the second SRS may be transmitted based on a configuration related to the transmission timing of the first SRS. Accordingly, the complexity of the configuration between the base station and the UE and the complexity of the UE operation may be reduced by arranging the transmission timing of the additional SRS together with the transmission timing of the legacy SRS.

According to an embodiment of the disclosure, the second SRS is transmitted in a specific subframe. The specific subframe is based on an uplink subframe after the subframe in which the DCI triggering transmission of the SRS is detected. The second SRS may be delayed and transmitted based on the specific subframe wholly or partially overlapping a resource region in which another uplink channel is transmitted. Accordingly, it is possible to prevent collision between the second SRS and another uplink channel and to ensure the reliability of the second SRS transmission.

According to an embodiment of the disclosure, when a subframe in which the delayed transmission of the second SRS is performed wholly or partially overlaps a resource region in which another uplink channel is transmitted, the second SRS may be redelayed and transmitted. The transmission of the second SRS may be dropped based on a number of times of delay of the transmission of the second SRS exceeding a predetermined value. Accordingly, it is possible to prevent collision with another uplink channel due to the changed transmission timing of the second SRS. Further, it is possible to prevent the UE-base station operation from becoming too complicated and prevent indiscriminate waste of resources.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

The invention claimed is:

1. A method for transmitting a sounding reference signal (SRS) by a user equipment (UE) in a wireless communication system, the method comprising:
   receiving configuration information related to transmission of the SRS;
   receiving downlink control information (DCI) which triggers transmission of the SRS; and
   transmitting the SRS,
   wherein the SRS is based on both of a first SRS and a second SRS, the second SRS being configured in a time resource region different from the first SRS,
   wherein the first SRS is configured in 4 symbols of a special subframe,
   wherein the second SRS is configured in one or more symbols other than a last symbol of a normal Uplink (UL) subframe excluding the special subframe,
   wherein, based on the SRS being the second SRS, the normal UL subframe in which the second SRS is transmitted is determined based on a UE-specific configuration related to a transmission timing of the first SRS, and
   wherein the UE-specific configuration is related to a transmission periodicity and a transmission offset of the first SRS.

2. The method of claim 1, wherein the normal UL subframe in which the second SRS is transmitted is based on a normal UL subframe after a subframe in which the DCI is detected.

3. The method of claim 2, wherein, based on the normal UL subframe after the subframe in which the DCI is detected overlapping wholly or partially with a time resource region in which another uplink channel is transmitted, the second SRS is delayed and transmitted.

4. The method of claim 3, wherein the second SRS is transmitted in a normal UL subframe after the normal UL subframe in which the second SRS is configured.

5. The method of claim 4, wherein the normal UL subframe after the normal UL subframe in which the second SRS is configured is a normal UL subframe based on the UE-specific configuration related to a transmission timing of the first SRS.

6. The method of claim 3, wherein, based on the normal UL subframe in which the delayed transmission of the second SRS is performed overlapping wholly or partially with a time resource region in which another uplink channel is transmitted, the second SRS is redelayed and transmitted.

7. The method of claim 6, wherein the transmission of the second SRS is dropped based on a number of times of delay of the transmission of the second SRS exceeding a predetermined value.

8. A user equipment (UE) configured to transmit a sounding reference signal (SRS) in a wireless communication system, the UE comprising:
one or more transceivers;
one or more processors; and
one or more memories operably connected to the one or more processors and storing instructions which, when executed by the one or more processors, configure the one or more processors to perform operations comprising:
receiving configuration information related to transmission of the SRS;
receiving downlink control information (DCI) which triggers transmission of the SRS; and
transmitting the SRS,
wherein the SRS is based on both of a first SRS and a second SRS, the second SRS being configured in a time resource region different from the first SRS,
wherein the first SRS is configured in 4 symbols of a special subframe,
wherein the second SRS is configured in one or more symbols other than a last symbol of a normal Uplink (UL) subframe excluding the special subframe,
wherein, based on the SRS being the second SRS, the normal UL subframe in which the second SRS is transmitted is determined based on a UE-specific configuration related to a transmission timing of the first SRS, and
wherein the UE-specific configuration is related to a transmission periodicity and a transmission offset of the first SRS.

9. A method for receiving a sounding reference signal (SRS) by a base station in a wireless communication system, the method comprising:
transmitting configuration information related to transmission of the SRS;
transmitting downlink control information (DCI) which triggers transmission of the SRS; and
receiving the SRS,
wherein the SRS is based on both of a first SRS and a second SRS, the second SRS being configured in a time resource region different from the first SRS,
wherein the first SRS is configured in 4 symbols of a special subframe,
wherein the second SRS is configured in one or more symbols other than a last symbol of a normal Uplink (UL) subframe excluding the special subframe,
wherein, based on the SRS being the second SRS, the normal UL subframe in which the second SRS is transmitted is determined based on a UE-specific configuration related to a transmission timing of the first SRS, and
wherein the UE-specific configuration is related to a transmission periodicity and a transmission offset of the first SRS.

* * * * *